United States Patent
Okajima et al.

(10) Patent No.: US 6,568,766 B1
(45) Date of Patent: May 27, 2003

(54) BICYCLE RIM

(75) Inventors: Shinpei Okajima, Izumi (JP); Tsutomu Muraoka, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/793,973

(22) Filed: Feb. 28, 2001

(51) Int. Cl.$^7$ ............................................. B60B 21/02
(52) U.S. Cl. ................................... 301/95.104; 301/58
(58) Field of Search ............................. 301/58, 95.101, 301/95.104, 95.105, 95.106

(56) References Cited

U.S. PATENT DOCUMENTS

| | | | |
|---|---|---|---|
| 2,126,222 A | * | 8/1938 | Schwinn |
| 4,487,456 A | * | 12/1984 | Zulauf |
| 4,626,036 A | | 12/1986 | Hinsberg et al. |
| 5,538,058 A | | 7/1996 | Aloy |
| 5,651,591 A | | 7/1997 | Mercat et al. |
| 5,975,646 A | * | 11/1999 | Campagnolo ............ 301/95.101 |
| 6,019,149 A | * | 2/2000 | Stringer .................... 152/381.5 |
| 6,024,413 A | * | 2/2000 | Dixon et al. ................... 301/58 |
| 6,070,948 A | | 6/2000 | Chen |
| 6,089,672 A | * | 7/2000 | Chen ............................ 301/58 |
| 6,145,937 A | | 11/2000 | Chen |
| 6,145,938 A | | 11/2000 | Dietrich |
| 6,183,047 B1 | * | 2/2001 | Kuhl ..................... 301/95.104 |
| 6,378,953 B2 | * | 4/2002 | Mercat et al. ......... 301/95.106 |

FOREIGN PATENT DOCUMENTS

| | | |
|---|---|---|
| DE | 32 34 803 A1 | 3/1984 |
| EP | 0 579 525 B1 | 1/1996 |
| EP | 0 893 280 A1 | 1/1999 |
| FR | 2 351 803 A | 7/1995 |
| JP | 60012315 A | 1/1985 |

OTHER PUBLICATIONS

Race Catalogue; Bike RIms; 1 page; Tokyo International Bicycle show on Nov. 10, 2000.
Weinmann 2001 Catalogue; Bike Rims; 6 pages; Interbike Las Vegas show 2000.
Alexrims 2001 Catalogue; Bike Rims; 4 pages; Interbike Las Vegas show 2000.

* cited by examiner

Primary Examiner—Russell D. Stormer
(74) Attorney, Agent, or Firm—Shinjyu Global IP Counselors, LLP

(57) ABSTRACT

A hollow bicycle rim includes a pair of side portions, an outer portion and a spoke attachment portion with a plurality of spoke openings. The side portions have ribs to form opposing tire supporting surfaces. The outer portion extends between the side portions. The outer portion includes a pair of annular inclined surfaces extending radially inwardly from the side portions with a curved connecting surface extending therebetween. The spoke attachment portion is rigidly coupled with the side portions and the outer portion. The inclined surfaces are preferably angled between three degrees and seventeen degrees. The outer annular portion preferably has at least one aperture, but fewer than half of the number of spoke openings. The side portions preferably have a pair of inner bent sections. A pair of spoke attachment sections with the plurality of circumferentially arranged spoke openings preferably have radial lengths larger than the spoke openings.

37 Claims, 18 Drawing Sheets

BICYCLE RIM

CROSS-REFERENCE TO RELATED APPLICATIONS

This invention is related to U.S. patent application Ser. No. 09/715,182, filed Nov. 20, 2000, assigned to SHIMANO INC.

BACKGROUND OF THE INVENTION

1. Field of the Invention

This invention generally relates to a bicycle rim for use with a tubeless tire, a plurality of spokes and a hub adapted to be coupled to a bicycle frame. More specifically, the present invention relates bicycle rim, which maintains a tight seal with a tubeless tire even when tire deflection is caused by tire contact with an obstruction or protrusion.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are provided with a flange that is used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. In particular, the spoke nipples have flanges, which engage the interior surface of the rim. Alternatively, the spokes may be reversed, with the outer end having the nail head and the inner end having the threads for engaging spoke nipples, which secure the inner ends of the wire spokes to the hub.

With a spoke constructed in this manner, the nipples are installed in nipple holes formed in either the rim or the hub. The spokes are inserted through holes in either the hub flange or the rim with the flanges of the spokes engaging the areas surrounding the holes in either the hub flange or the rim. The male threads on the ends of the spokes are threaded into the female threads of the spoke nipples installed in the openings of the hub flange or the rim.

It is desirable in the bicycle industry to have as few spokes as possible. One problem with conventional spokes is the concentrated stress applied to the rim. Moreover, if fewer spokes are used, the stress on the rim becomes increasingly larger. Typically, conventional spokes are attached to either the inner edge or the lateral side portions of the rim. Thus, the amount of force that can be applied to the rim by the spokes depends mainly upon the thickness of the inner edge of the rim or the lateral side portions of a rim. In order to accommodate the stress from the spokes, the inner edge of the rim can be made thicker. However, making the rim thicker increases the weight of the rim.

In recent years, wheels have been designed with reinforcing members arranged on the outer ends of the spokes to aid in disbursing the stress concentrated on portions of the rim. Such a wheel is disclosed in Shimano's U.S. Pat. No. 6,126,243. This wheel (i.e., rim, and spoke combination) is very strong, lightweight, and relatively simple and inexpensive to manufacture. However, this design requires drilling a plurality of access holes in the outer peripheral surface of the rim. The spokes and reinforcement members are inserted through these holes into spoke openings of the rim during assembly. These holes then have to be covered and a tubed tire installed. If a spoke needs to be replaced, the tire, tube and cover have to be removed from the rim so the spoke can be replaced.

Additionally, with these types of wheels, it is sometimes difficult to use a tubeless tire due to the plurality access holes. These holes are sealed in order for a tubeless tire to be utilized. The use of seals can allow leaking air, especially after prolonged use. Moreover, if a spoke needs to be replaced, the tire and seal have to be removed from the rim so the spoke can be replaced. Then, the seal and tire need to be replaced. This is inconvenient and can cause the seal and/or tire to be stretched or damaged.

There are some rims with tubeless tires on the market which do not include a plurality of access holes, eliminating the need for a seal. However, these prior rims for tubeless tires suffer from other deficiencies. Specifically, these rims can be expensive and complicated to manufacture and assemble. Moreover, these prior rims can cause punctures or leaks when an obstruction is contacted by the tire.

In view of the above, there exists a need for a bicycle rim which overcomes the above mentioned problems in the prior art. This invention addresses this need in the prior art as well as other needs, which will become apparent to those skilled in the art from this disclosure.

SUMMARY OF THE INVENTION

One object of the present invention is to provide a rim for a tubeless tire that minimizes loss of air when an obstruction pushes the tire axially toward the center plane of the rim.

Another object of the present invention is to provide a rim for a tubeless tire that has side mounted spokes disposed inwardly of the braking surfaces to avoid interference therebetween.

Another object of the present invention is to provide a rim for a tubeless tire that is relatively strong but relatively lightweight.

Still another object of the present invention is to provide a rim for a tubeless tire that is relatively simple and inexpensive to manufacture and/or assemble.

The foregoing objects can basically be attained by providing a bicycle rim comprising first and second annular side portions, an outer annular portion and a spoke attachment portion. The first and second annular side portions have first and second ribs to form opposing first and second annular tire supporting surfaces. The outer annular portion extends between the first and second annular side portions to form first and second outer corners. The outer annular portion includes first and second annular inclined surfaces with a curved connecting surface extending therebetween. The first and second annular inclined surfaces extend radially inwardly from the first and second outer corners to the curved connecting surface. The spoke attachment portion is rigidly coupled with the first and second annular side portions and the outer annular portion. The first and second annular inclined surfaces are angled between about three degrees and about seventeen degrees relative to an imaginary line passing through the first and second outer corners.

The foregoing objects can also basically be attained by providing a bicycle rim comprising first and second annular side portions, an outer annular portion and an inner annular portion. The first and second annular side portions have first and second ribs to form opposing first and second annular tire supporting surfaces. The outer annular portion extends between the first and second annular side portions to form first and second outer corners. The outer annular portion includes first and second annular inclined surfaces with a curved connecting surface extending therebetween. The inner annular portion extends radially inwardly of the first and second annular side portions and the outer annular portion to form an annular hollow area. The inner annular portion has a plurality of circumferentially arranged spoke openings. The outer annular portion has at least one aperture, but fewer than half of the number of spoke openings.

The foregoing objects can also basically be attained by providing a bicycle rim comprising first and second annular side portions, an outer annular portion and an inner annular portion. The first and second annular side portions have first and second outer ribs to form opposing first and second annular tire supporting surfaces and first and second inner bent sections. The outer annular portion extends between the first and second annular side portions to form first and second outer corners. The inner annular portion has first and second spoke attachment sections with radial lengths and an inner annular section extending between the first and second spoke attachment sections. The first and second spoke attachment sections extend radially inwardly from the first and second inner bent sections such that the first and second spoke attachment sections are offset from the first and second side portions. The first and second spoke attachment sections include a plurality of circumferentially arranged spoke openings having radial lengths larger than one half of the radial lengths of the first and second spoke attachment sections.

These and other objects, features, aspects and advantages of the present invention will become apparent to those skilled in the art from the following detailed description, which, taken in conjunction with the annexed drawings, disclose preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
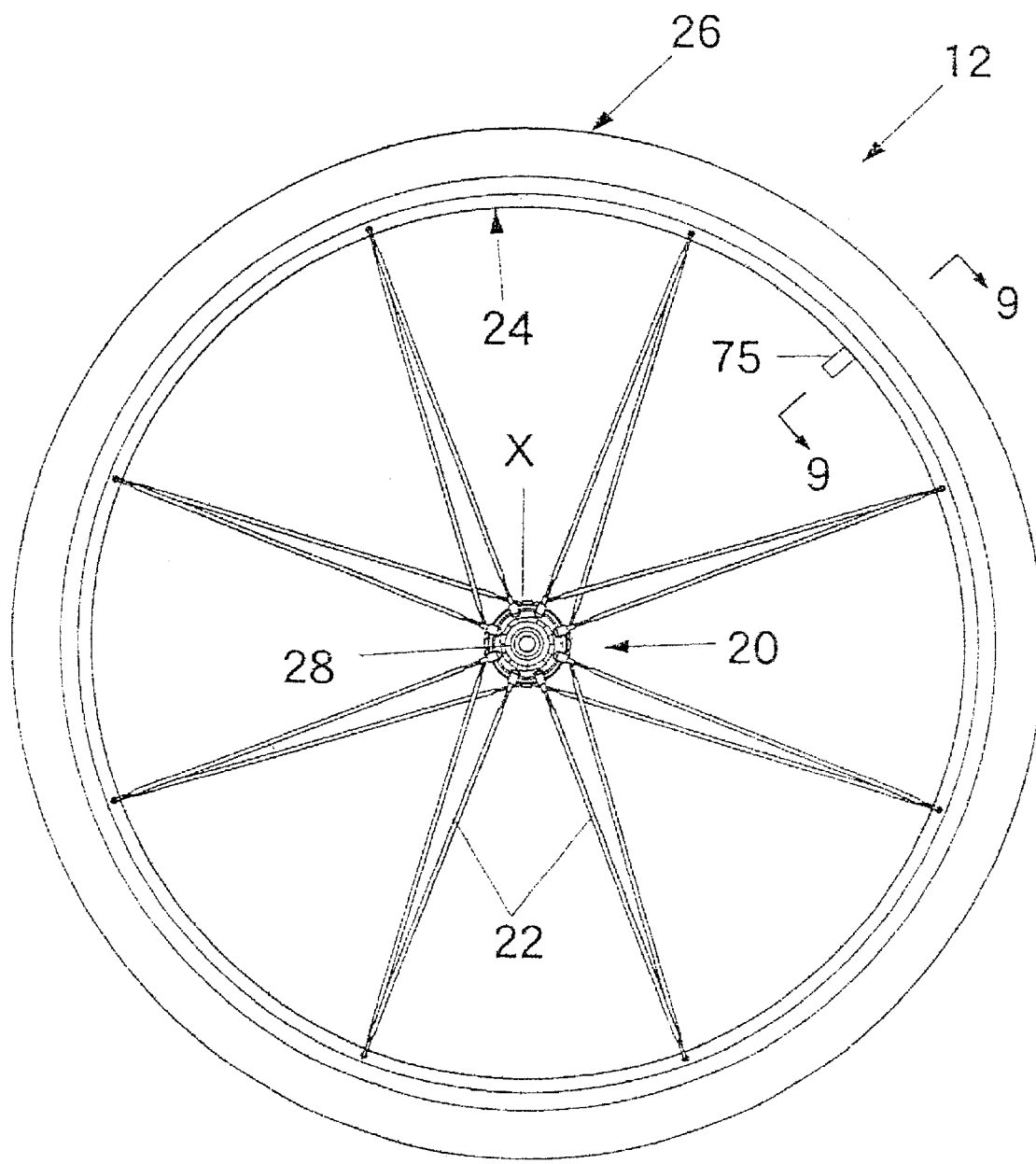
FIG. 1 is a side elevational view of a bicycle wheel having a rear hub, a plurality (sixteen) of spokes with reinforcement members and a rim in accordance with a first embodiment of the present invention.
Figure 2:
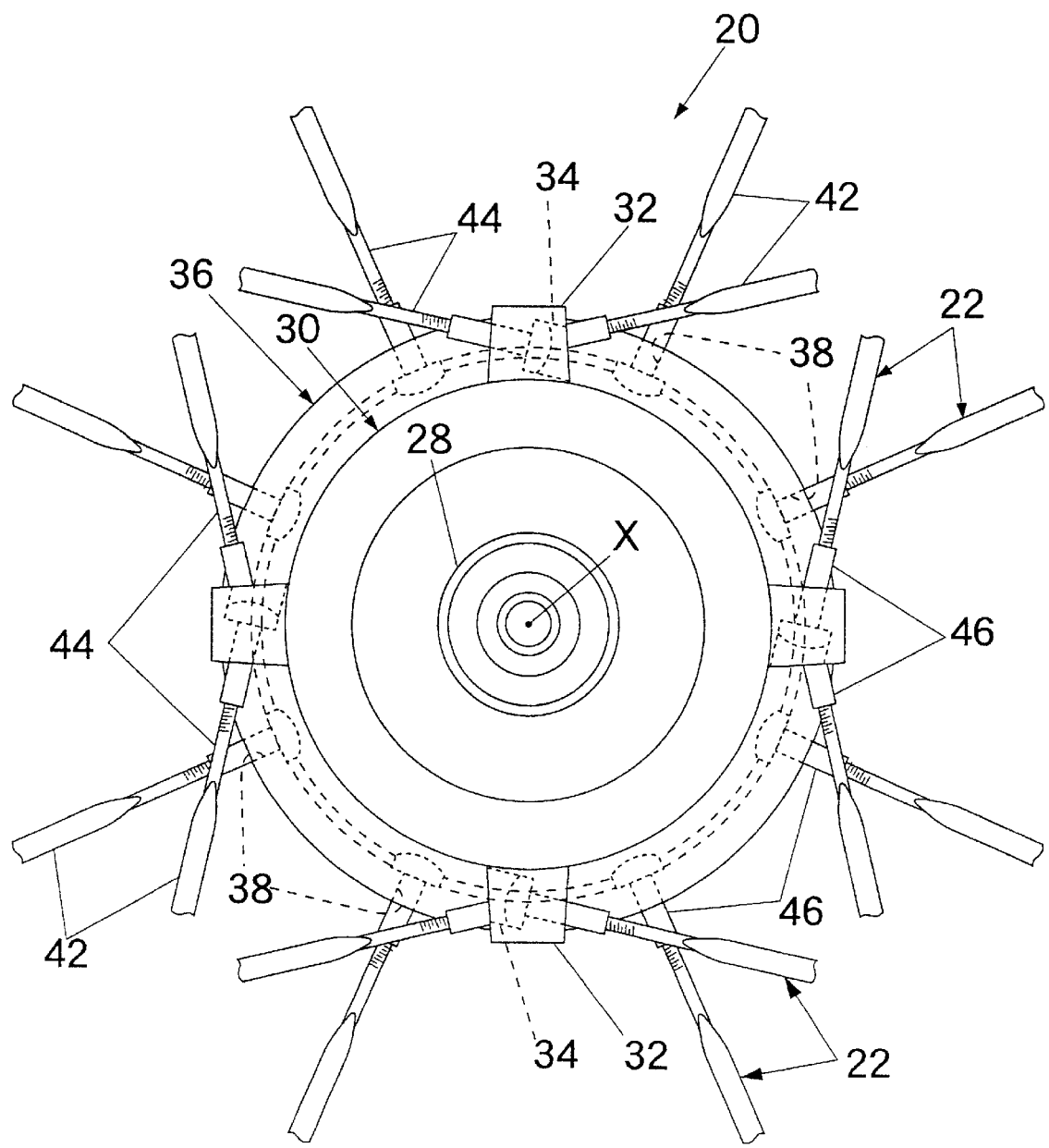
FIG. 2 is an enlarged side elevational view of the rear bicycle hub illustrated in FIG. 1 with the inner end portions of the spokes coupled thereto.

Referring initially to FIGS. 1 and 2, a rear bicycle wheel 12 is illustrated in accordance with the present invention. Bicycle wheel 12 has a central hub 20, a plurality of outwardly extending spokes 22 and an annular rim 24 with a pneumatic tire 26 coupled thereto in a conventional manner. Of course, it will be apparent to those skilled in the art from this disclosure that bicycle wheel 12 can be utilized as either a front bicycle wheel by modifying the hub 20. In the illustrated embodiment, bicycle wheel 12 is a rear bicycle wheel with a first set of radial spokes and a second set of tangential spokes. However, it will be apparent to those skilled in the art from this disclosure that the description pertaining to the construction of bicycle wheel 12 applies to either a front bicycle wheel or a rear bicycle wheel.

Figure 23:
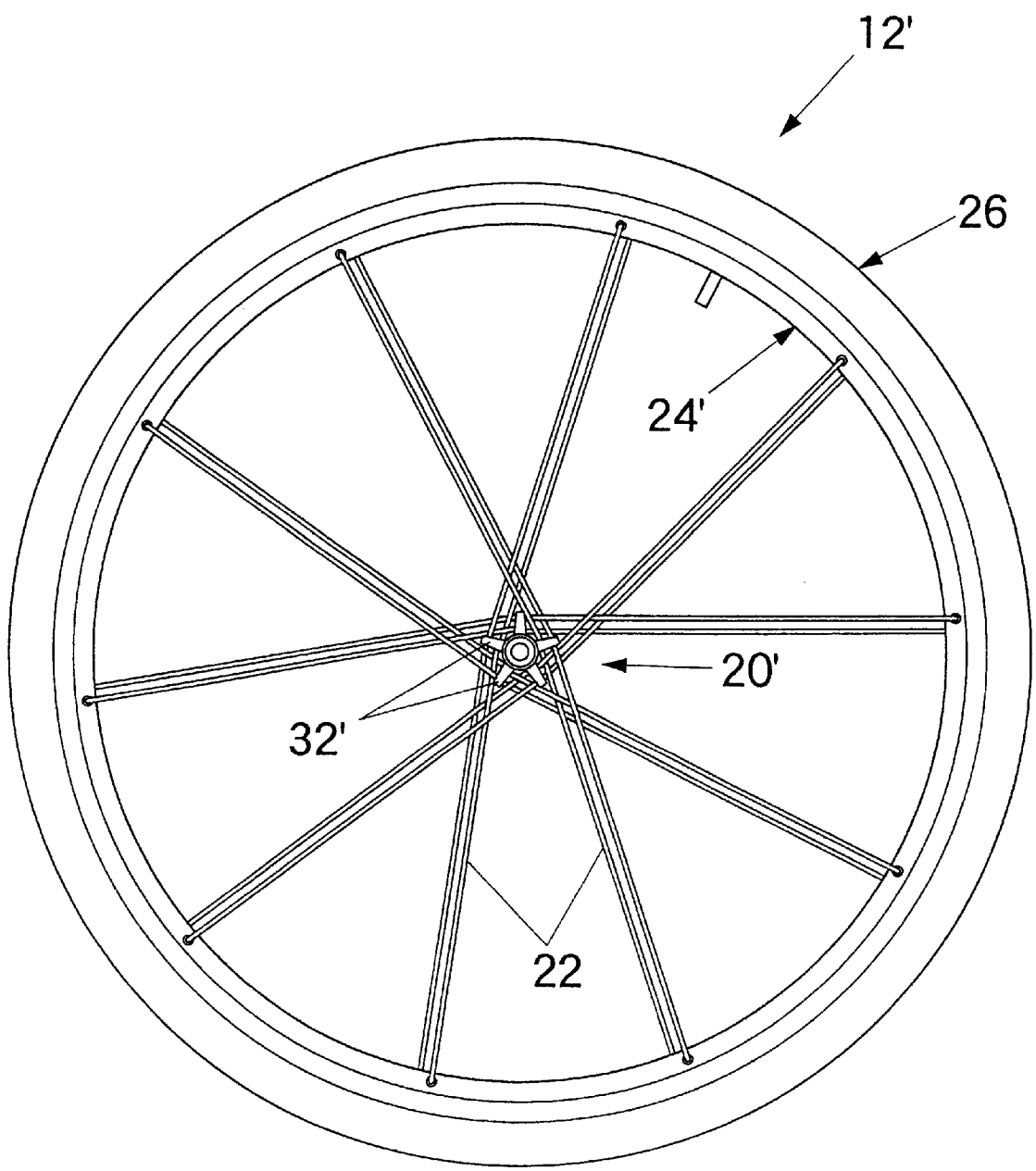
FIG. 23 is a side elevational view of a front bicycle wheel with a front hub, a plurality (twenty) of spokes with reinforcement members and a rim in accordance with a fifth embodiment of the present invention.

In the illustrated embodiment shown herein, bicycle wheel 12 has sixteen spokes 22 extending between central hub 20 and annular rim 24. Of course, it will be apparent to those skilled in the art from this disclosure that the bicycle wheel 12 can have fewer or more spokes 22 if needed and/or desired. For example, bicycle wheel 12 could have twenty-four spokes with twelve radial spokes and twelve tangential spokes. Moreover, in the illustrated embodiment, opposing pairs of spokes 22 are circumferentially aligned with each other at annular rim 24. Of course it will be apparent to those skilled in the art that opposing pairs of spokes could be circumferentially offset from each other at annular rim 24. For example as seen in FIG. 23, a front bicycle wheel 12' is illustrated in accordance with the present invention with all tangential spokes 22 that have circumferentially offset outer ends, as discussed below.

As seen in FIG. 2, hub 20 has a tubular body section 30 with four spoke attachment points 32 arranged axially on one side of tubular body section 30. Spoke attachment points 32 are provided with holes 34 for tangentially coupling spokes 22 (tangential spokes) thereto. A tubular mounting portion 36 is arranged axially on the opposite side of tubular body portion 30. Tubular mounting portion 36 is provided with a plurality of spoke attachment slots 38 for radially coupling spokes 22 (radial spokes) thereto. Radial spokes and tangential spokes have identical configurations. However, the length (or size) of tangential spokes may be slightly different than radial spokes. Accordingly, radial and tangential spokes will be given the same reference numerals herein. Tubular body section 30 has an axial bore that is adapted to receive a hub assembly 28 therein.

The number and shape of the spoke attachment points 32 and the configuration of tubular mounting portion 36 will depend upon the number of spokes and their shapes. Accordingly, it will be apparent to those skilled in the art from this disclosure that other types and shapes of hubs can be utilized in connection with the present invention. Moreover, it will be apparent to those skilled in the art that hub 20 could be designed to use all radial/tangential spokes and/or more or fewer than sixteen spokes. For example, hub 20 could be designed with six spoke attachment points (with two holes formed in each spoke attachment point) and twelve spoke attachment slots formed in the tubular mounting portion to form a twenty-four spoke wheel.

Figure 12:
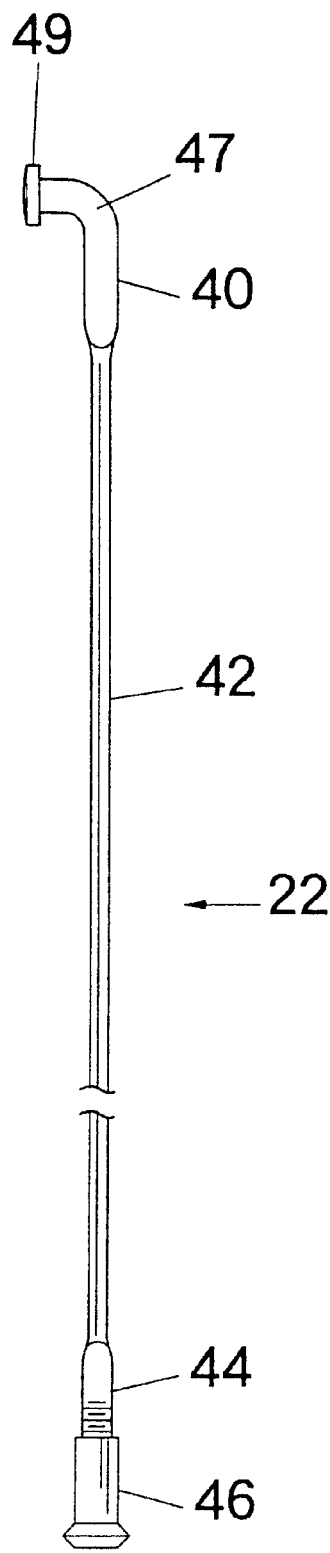
FIG. 12 is an enlarged, partial side elevational view of one of the spokes illustrated in FIGS. 1–4, 10 and 11 in accordance with the present invention.
Figure 13:
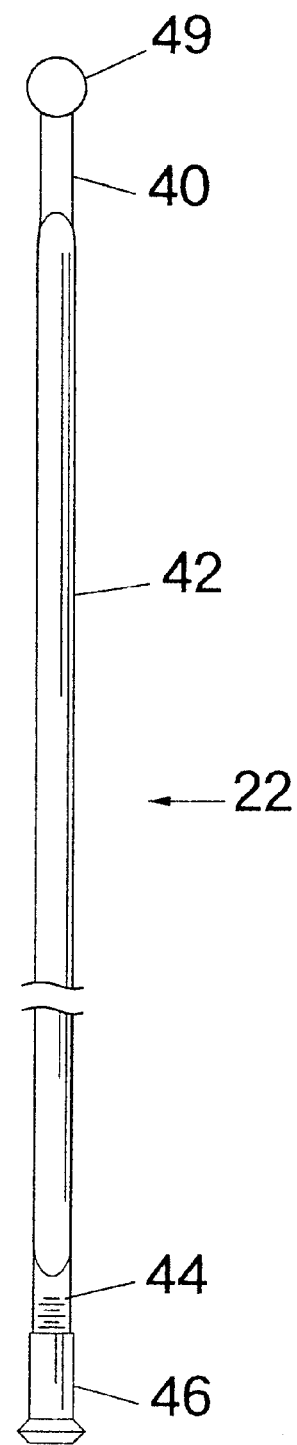
FIG. 13 is a partial side edge elevational view of the spoke illustrated in FIG. 12.
Figure 14:
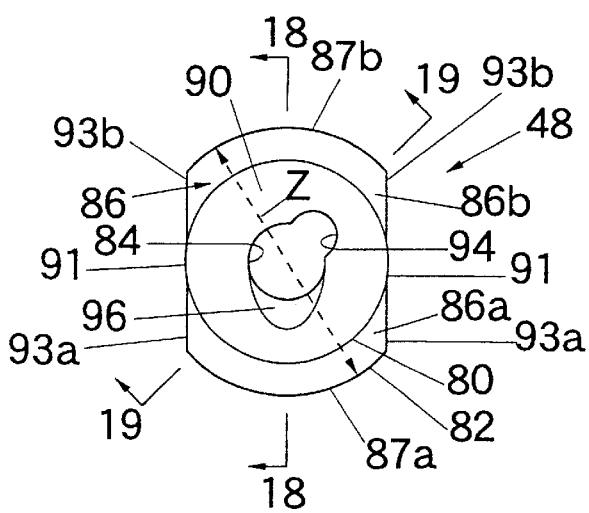
FIG. 14 is an enlarged side elevational view of one of the reinforcement members or washers illustrated in FIGS. 3, 4, 10 and 11.
Figure 17:
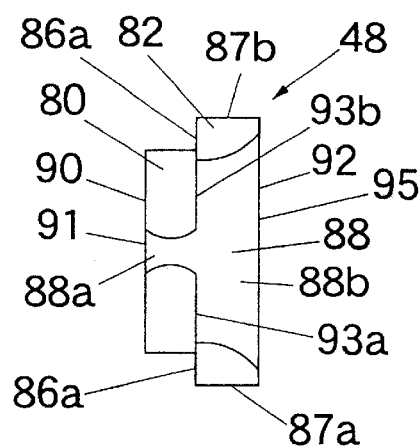
FIG. 17 is a side edge elevational view of the reinforcement member or washer illustrated in FIGS. 14–16.

Each of the spokes 22 has an outer end portion 40, a center or a middle portion 42 and an inner end portion 44, as seen in FIGS. 12 and 13. Inner end portions 44 of spokes 22 are preferably externally threaded for receiving spoke nipples 46, as discussed in more detail below. Outer end portions or spoke heads 40 are coupled to rim 24 by reinforcement members 48 as also discussed below in more detail. Reinforcement members or washers 48 are designed to disperse the stress applied to rim 24 by spokes 22.

Figure 6:
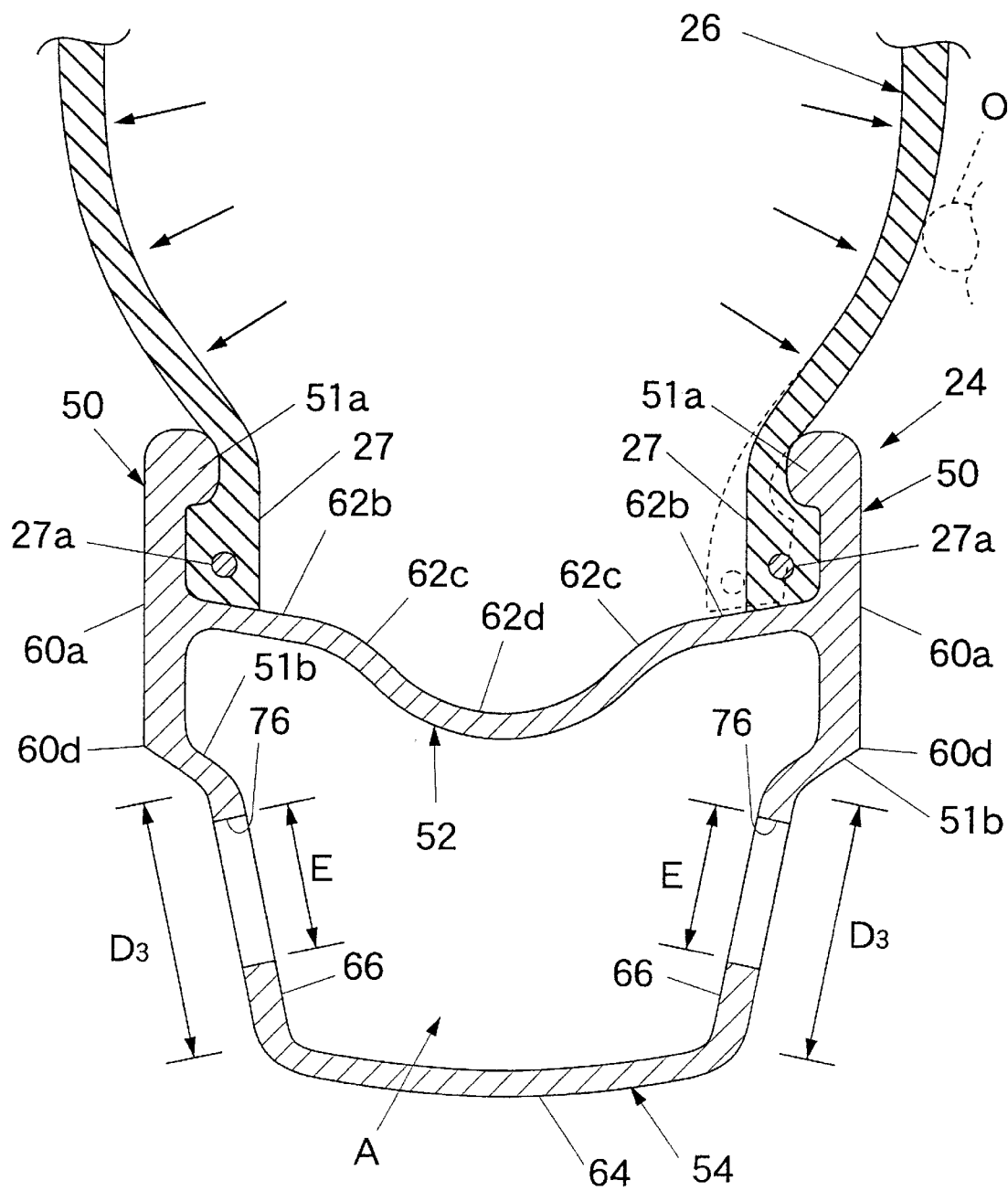
FIG. 6 is a partial, cross-sectional view of the bicycle rim as seen along section line 4—4 of FIG. 3 with the spokes and reinforcement members removed and a tubeless tire coupled thereto, with a deformed tubeless tire shown in broken lines.

Rim 24 is designed to have pneumatic tire 26 fastened thereto as seen in FIGS. 1 and 6. Rim 24 is especially designed for use with a tubeless pneumatic tire 26. Rim 24 is constructed of a substantially rigid material, such as those materials, which are well known in the art. For example, rim 24 can be constructed of any suitable metallic material, such as plated steel, stainless steel, aluminum, magnesium or titanium, as well as other non-metallic materials, such as a carbon fiber composite.

Figure 4:
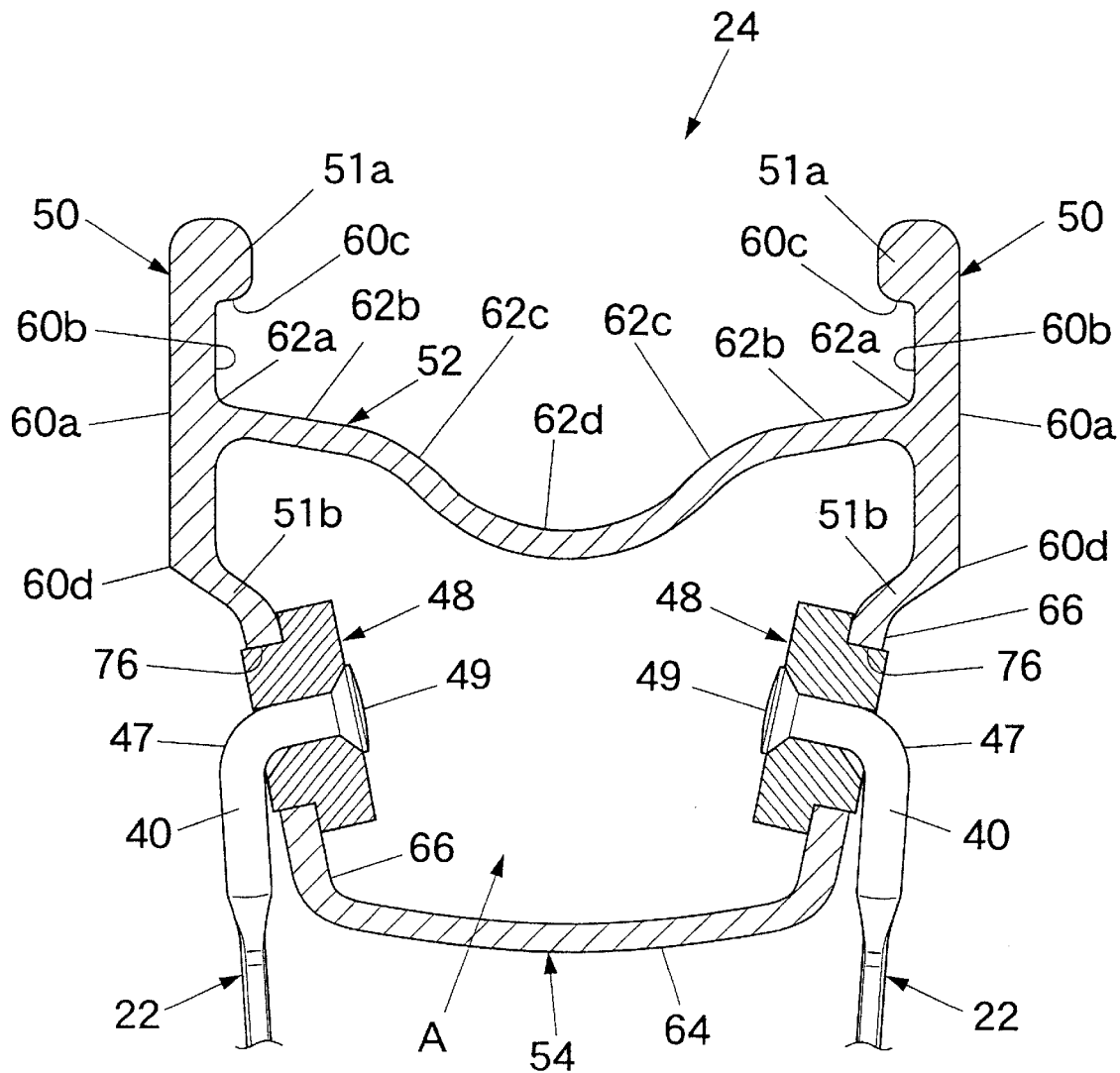
FIG. 4 is a partial, cross-sectional view of the bicycle rim as seen along section line 4—4 of FIG. 3 with a pair of spokes illustrated in elevation and the rim and reinforcement members illustrated in cross-section.
Figure 9:
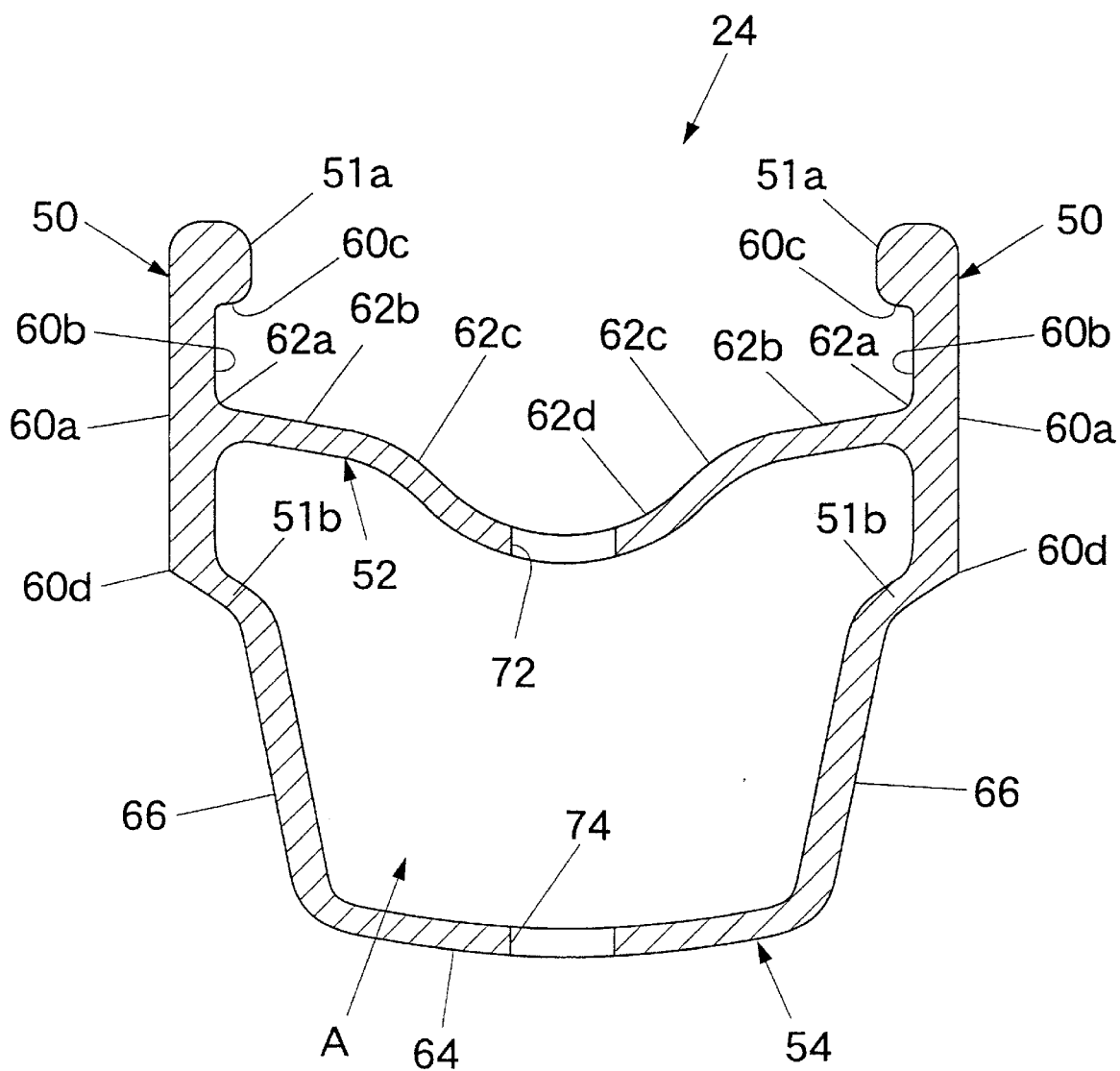
FIG. 9 is a partial, cross-sectional view of the bicycle rim as seen along section line 9—9 of FIG. 1 to show a valve receiving aperture.

Rim 24 is substantially circular as seen in side elevation (FIG. 1), and has a pair (first and second) of annular side portions 50, an outer annular portion 52 and an inner annular portion or spoke attachment portion 54 rigidly coupled together to form an annular hollow area A, as seen in FIGS. 4, 6 and 9. Rim 24 is designed for rotation about a center axis X. Annular side portions 50 are plate-shaped members formed with a pair (first and second) of ribs 51a and a pair (first and second) of bent sections 51b, respectively. Outer annular portion 52 is a tubular member that extends axially between annular side portions 50. Outer annular portion 52 is fixedly coupled to annular side portions 50 at a radial position between ribs 51a and bent sections 51b. Inner annular portion 54 is a tubular member that is substantially U-shaped (as seen in cross-section in FIGS. 4 and 6). Inner annular portion 54 is fixedly coupled to bent sections 51b of annular side portions 50.

As best seen in FIGS. 3–6, annular side portions 50 include first and second annular braking surfaces 60a facing in axially opposite directions away from each other, a pair (first and second) of opposed axially facing annular tire supporting surfaces 60b and a pair (first and second) of first and second tire supporting or abutment surfaces 60c, respectively. Tire supporting surfaces 60b face each other and are formed on the respective opposite sides of annular side portions 50 from braking surfaces 60a. In the illustrated embodiment, tire supporting surfaces 60b are preferably parallel to each other and parallel to braking surfaces 60a.

Ribs 51a form abutment surfaces 60c facing radially inwardly to retain tire 26. Preferably, annular side portions 50 have a minimum thickness of about 1.4 millimeters. Ribs 51a preferably extend axially toward each other about 1.1 millimeters from respective side portions 50 to form abutment surfaces 60c. Bent sections 51b are angled sections that form sharp external annular corners 60d (i.e. first and second sharp external corners) with braking surfaces 60a of side portions 50. Such an arrangement increases the strength and durability of rim 24. Additionally, this configuration reduces the amount of material utilized in rim 24.

Outer annular portion 52 is preferably approximately 0.9 millimeters thick and extends generally axially between annular side portions 50 to form a pair (first and second) of annular outer corners or corner surfaces 62a. Outer annular portion 52 preferably includes a pair (first and second) of annular inclined surfaces 62b extending from outer corners 62a, a pair (first and second) of annular transitional inner corners 62c and an annular curved connecting surface 62d.

Figure 5:
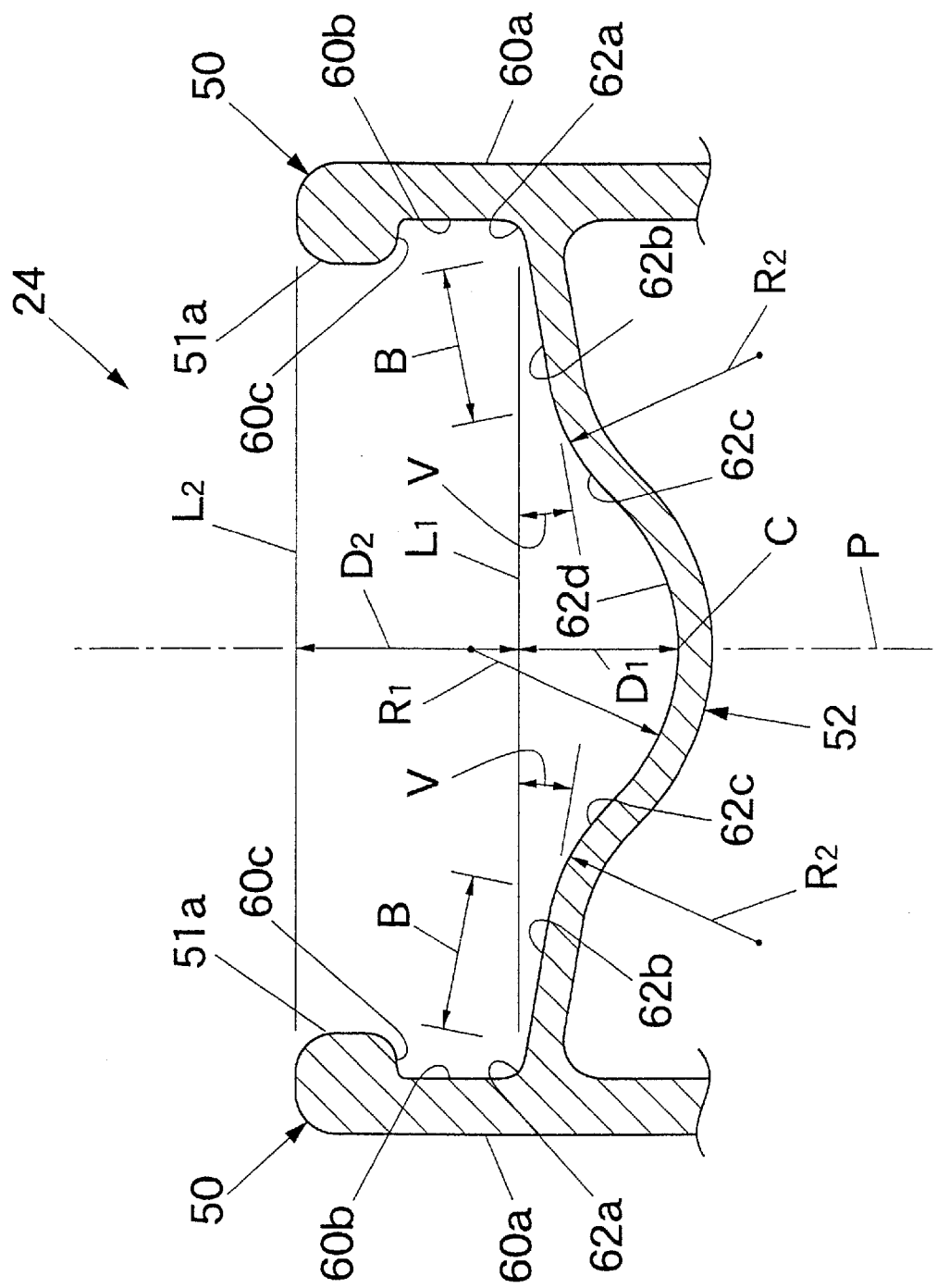
FIG. 5 is an enlarged, partial cross-sectional view of the outer portion of the bicycle rim illustrated in FIG. 4.

As best seen in FIG. 5, curved connecting surface 62d is preferably a concave curved tubular surface extending in an axial direction and preferably has a radius of curvature $R_1$ of approximately 5.0 millimeters as seen in FIG. 5. Transitional inner corners 62c are preferably formed by convex curved tubular surfaces, which connect concave curved connecting surface 62d to annular inclined surfaces 62b in a smooth manner. In other words, there are no sharp changes in direction or transitions between curved connecting surface 62d and annular inclined surfaces 62b.

Curved connecting surface 62d preferably has a center point C arranged on a center plane P of the bicycle rim 24 as seen in FIG. 5. Center point C lies on a circle surrounding rotational axis X and passing through the radially innermost point of curved connecting surface 62d. Center point C is preferably radially spaced inwardly a distance $D_1$ of approximately 3.85 millimeters from an imaginary line $L_1$ passing through the pair of outer corners 62a. Moreover, center point C of curved connecting surface 62d is preferably spaced radially inwardly approximately 9.7 millimeters from an imaginary line $L_2$ passing through the outer peripheral edges of the annular side portions 50. Thus imaginary line $L_1$ is preferably spaced a distance $D_2$ of about 5.85 millimeters from imaginary line $L_2$. In any event, imaginary line $L_1$ is spaced a distance $D_2$ of between about 4.5 millimeters and about 6.5 millimeters from imaginary line $L_2$.

Imaginary lines $L_1$ and $L_2$ are parallel to a center axis X of bicycle rim 24 and are parallel to each other as seen in FIGS. 1, 2 and 5. In other words, imaginary lines $L_1$ and $L_2$ lie on concentric imaginary cylinders formed about center axis X of bicycle rim 24, the imaginary cylinders passing through outer corners 62a and outer peripheral edges of annular side portions 50, respectively. Thus, a tire receiving recess is formed between annular side portions 50 and radially outwardly of outer annular portion 52.

Referring still to FIG. 5, annular inclined surfaces 62b are preferably angled an angle V of between about three degrees and about seventeen degrees relative to imaginary line $L_1$ passing through outer corners 62a. More specifically, annular inclined surfaces 62b are preferably angled an angle V of about 10 degrees relative to imaginary line $L_1$. Moreover, annular inclined surfaces 62b extend radially inwardly from outer corners 62a toward curved connecting surface 62d. Thus, a substantially U-shaped tire receiving recess is formed.

As mentioned above, transitional inner corners 62c are preferably formed of convex curved surfaces that connect annular inclined surfaces 62b with curved connecting surface 62d. More specifically, transitional inner corners 62c each preferably has a radius of curvature $R_2$ of approximately 5.0 millimeters such that a smooth transition between curved connecting surface 62d and annular inclined surfaces 62b is formed. Radius of curvature $R_2$ is preferably substantially equal to radius of curvature $R_1$ such that a smooth transition is formed. In any event, Radius of curvature $R_2$ and radius of curvature $R_1$ are configured to form a smooth transition without abrupt changes in direction between annular inclined surfaces 62b and curved connecting surface 62d. Therefore, when installing and inflating pneumatic tubeless tire 26 on rim 24, the inner edges of tire 26 can slide along curved connecting surface 62d, transitional inner corners 62c and annular inclined surfaces 62b into a supported position adjacent tire supporting surfaces 60b, respectively.

Referring still to FIG. 5, each of the annular inclined surfaces 62b preferably has a length B of approximately 3.39 millimeters as measured between outer corners 62a and inner transitional corners 62c. Moreover, annular inclined surfaces are preferably straight, flat conical surfaces extending between inner and outer corners 62c and 62a, respectively. In other words, annular inclined surfaces 62b are preferably conical surfaces that are angled radially inwardly from outer corners 62a and extend toward center plane P of bicycle rim 24 (i.e. toward inner transitional corners 62c).

As best seen in FIG. 9, outer annular portion 52 is preferably free of openings except for a single valve aperture 72 that is adapted to receive part of a valve 75 therein such that tubeless tire 26 can be used with rim 24, as discussed below. In any event, outer annular portion 52 has fewer openings than half of the number of spokes coupled to rim 24, as also discussed below in more detail. For example, if rim 24 has sixteen spokes, outer annular portion 52 has fewer than eight openings (i.e. seven or less).

Figure 7:
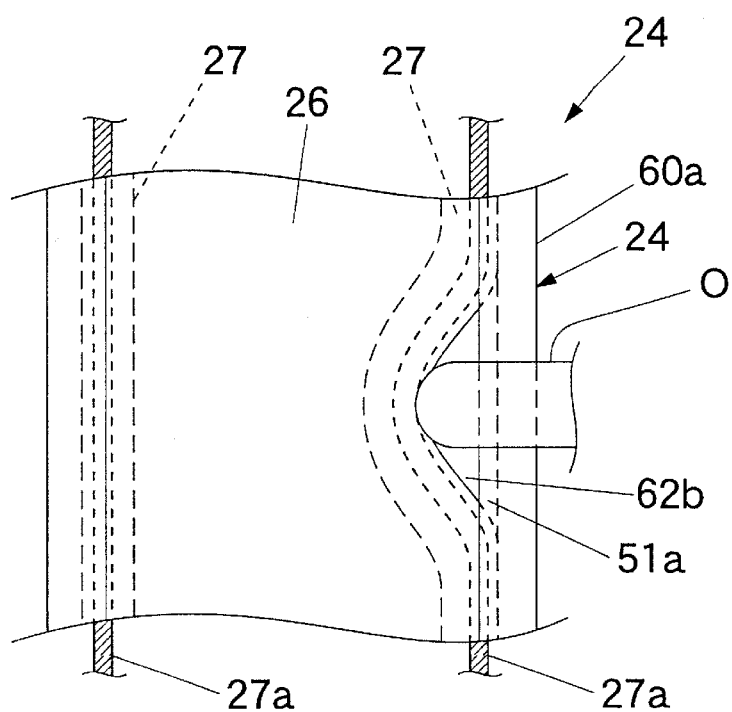
FIG. 7 is a diagrammatic, partial top plan view of the bicycle rim and tubeless tire mounted thereon showing a projection deflecting a wire reinforcing ring of the tire.
Figure 8:
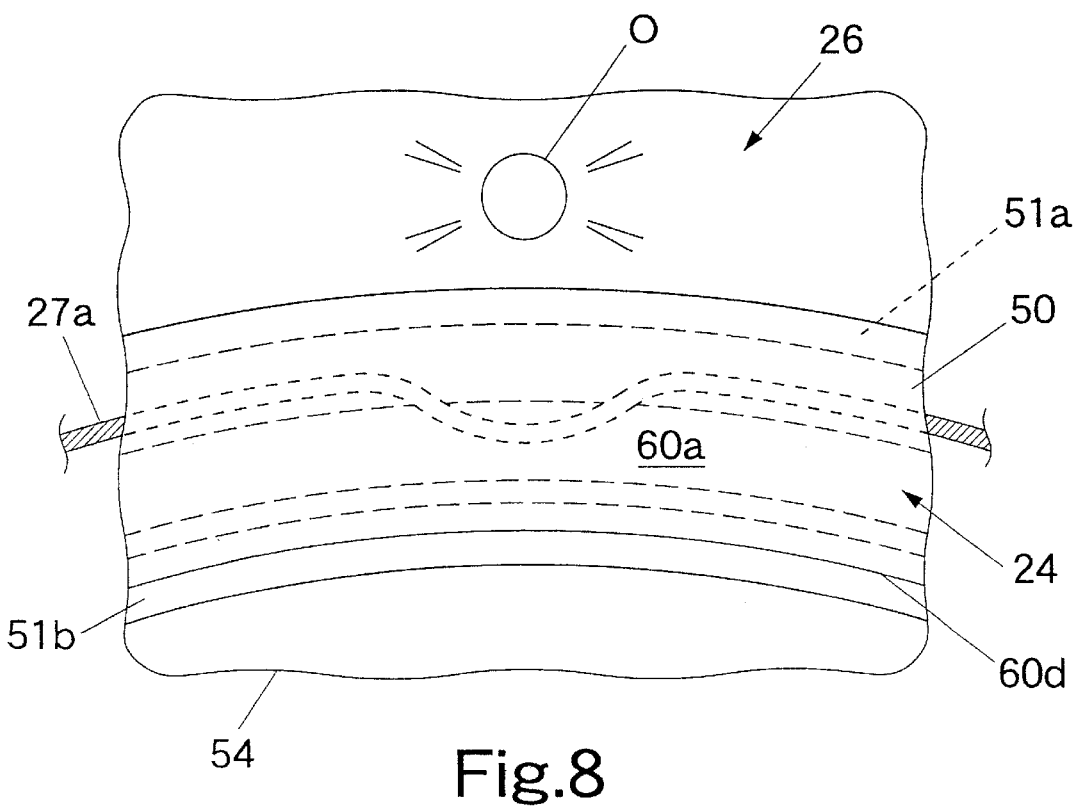
FIG. 8 is a diagrammatic, partial side elevational view the bicycle rim and tubeless tire illustrated in FIG. 7 showing the projection deflecting the wire reinforcing ring of the tire.

Referring to FIGS. 6–8, tire 26 is a tubeless tire with a pair of annular retaining portions or beads 27. Each annular retaining portion or bead 27 includes an annular reinforcing wire 27a that is retained within the tire receiving recess of rim 24. More specifically, retaining portions 27 contact tire supporting surfaces 60b and abutment surfaces 60c when tire 26 is inflated, as seen in FIG. 6. The annular reinforcing wires 27a are preferably substantially non-deformable metallic wires with a substantially constant circumference or diameter. Due to the configuration of rim 24, particularly outer annular portion 52 (curved connecting surface 62d, transitional inner corners 62c and annular inclined surfaces 62b), tubeless tire 26 can be easily mounted in the tire receiving recess of rim 24.

Additionally, due to the configuration of annular inclined surfaces 62b loss of air can be minimized when tire 26 is locally deformed in an axial direction. More specifically, as seen in FIGS. 7–8, when an obstruction O such as a rock contacts tire 26, an axial force is exerted on tire 26. Due to the presence of annular inclined surfaces 62b, a localized deflection or deformation occurs in one of the retaining portions 27 and the reinforcing wire 27a when the axial force is applied to tire 26. Because reinforcing wire 27a has a substantially constant circumference or diameter, the reinforcing wire 27a will move radially inward along the annular inclined surface 62b at the location of the obstruction O. Moreover, the reinforcing wire 27a will move axially toward center plane P at the location of the obstruction O. Thus, the substantially constant circumference of reinforcing wire 27a can be maintained. Furthermore, due to this motion of retaining portion 27 with reinforcing wire 27a, loss of air is minimized because a tight seal between retaining portion 27 and annular inclined surface 62b is maintained, as seen in FIG. 6.

Referring again to FIGS. 3–11, inner annular portion 54 is a spoke attachment portion and includes an inner annular section 64 and a pair (first and second) of spoke attachment sections 66. Inner annular section 64 is preferably approximately 0.9 millimeters thick and is a tubular member that forms an innermost radial edge of rim 24. Spoke attachment sections 66 extend radially outwardly from inner annular section 64 and are rigidly coupled to bent sections 51b of side portions 50. Thus, inner annular portion 54 is rigidly coupled with annular side portions 50 and outer annular portion 52. Spoke attachment sections 66 are preferably about 1.1 millimeters (±0.05 millimeters) thick and offset from side portions 50 due to the configuration of bent sections 51b and inner annular portion 54. More specifically, spoke attachment sections 66 are preferably offset toward center plane P of rim 24 from side portions 50 and angled relative to side portions 50.

Figure 3:
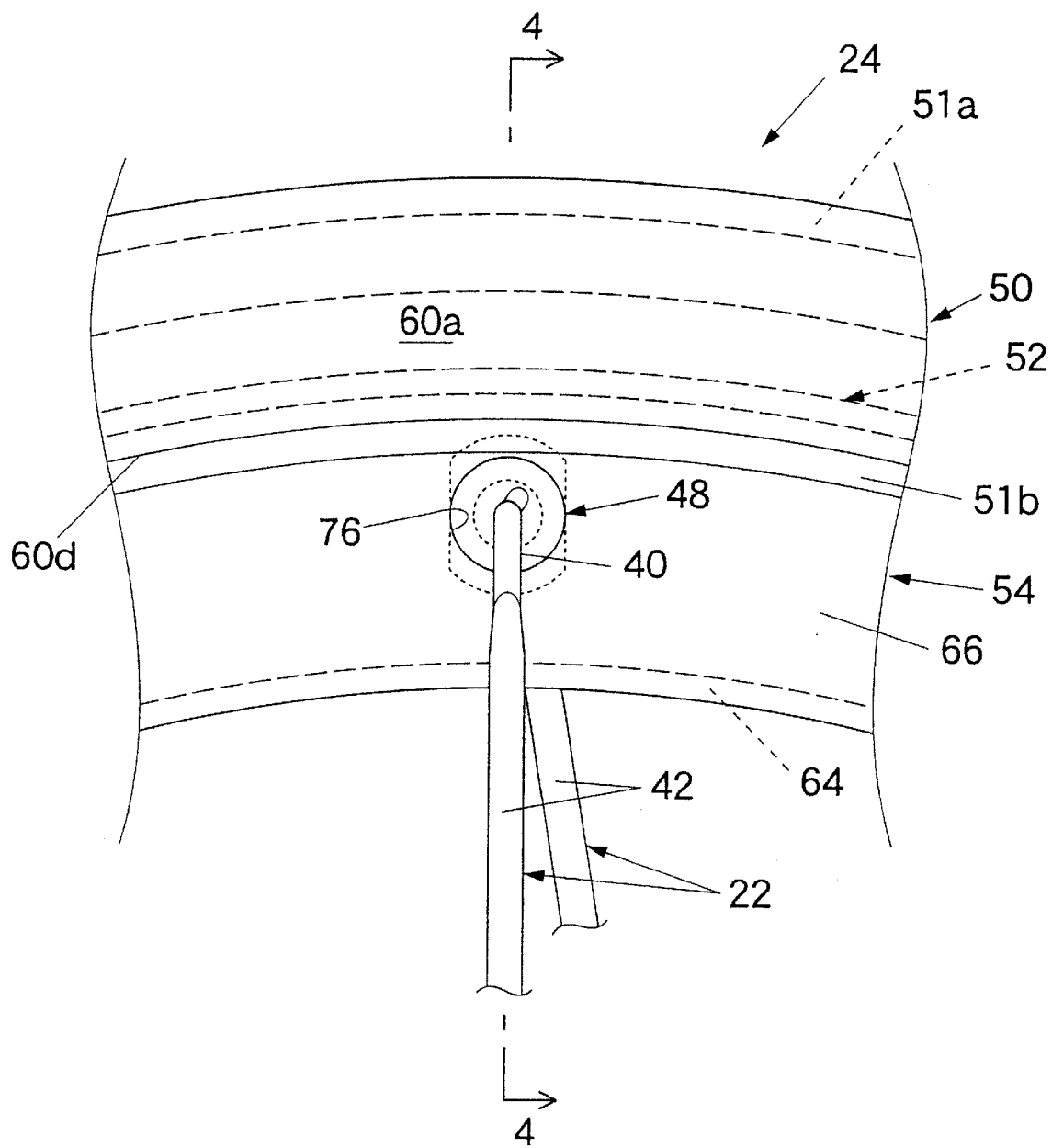
FIG. 3 is an enlarged, partial side elevational view of a portion of the bicycle wheel illustrated in FIG. 1 illustrating the connection between the rim and two of the spokes of the bicycle wheel aligned in the circumferential direction.

Spoke attachment sections 66 have radial lengths $D_3$ and include a plurality of circumferentially arranged spoke openings 76 formed therein, as best seen in FIGS. 3, 4 and 6. Preferably, radial lengths $D_3$ are approximately 10.5 millimeters. In the illustrated embodiment, pairs of opposed spoke openings 76 are aligned with each other in the circumferential direction. However, it will be apparent to those skilled in the art that spoke openings 76 could be offset from each other as needed and/or desired, and discussed below in reference to another embodiment of the present invention. Spoke openings 76 are preferably spaced radially outwardly of inner annular section 64 such that spoke openings 76 are adjacent bent sections 51b of side portions 50. However, when spokes 22 are coupled to rim 24 via spoke attachment sections 66, spokes 22 do not interfere with braking action on rim 24 due to the presence of bent sections 51b.

As mentioned above, outer annular portion 52 preferably includes a single aperture 72 that is adapted to receive part of the valve 75 therein. Inner annular portion 54 also includes a valve aperture 74 for receiving part of the valve 75, as seen in FIG. 9. More specifically, valve aperture 74 is preferably formed in inner annular section 64 of inner annular portion 54. Preferably, outer annular portion 52 is free of openings except for valve aperture 72. Moreover, inner annular section 64 is also preferably free of openings except for valve aperture 74. Valve 75 is relatively conventional and preferably centered between adjacent pairs of spokes 22. Accordingly, valve 75 will not be discussed or illustrated in detail herein.

Spoke openings 76 are formed in spoke attachment sections 66 and preferably equally spaced about the circumference of spoke attachment sections 66. In this embodiment, the plurality of spoke openings 76 are preferably circular openings that are larger than the outer end portions 40 of the spokes 22. Spoke openings 76 of the present invention are larger than conventional spoke openings. Therefore, reinforcement members 48 distribute the forces on rim 24 over a greater area than ordinary round spokes such that stress fracturing and/or tearing of rim 24 is minimized.

Figure 10:
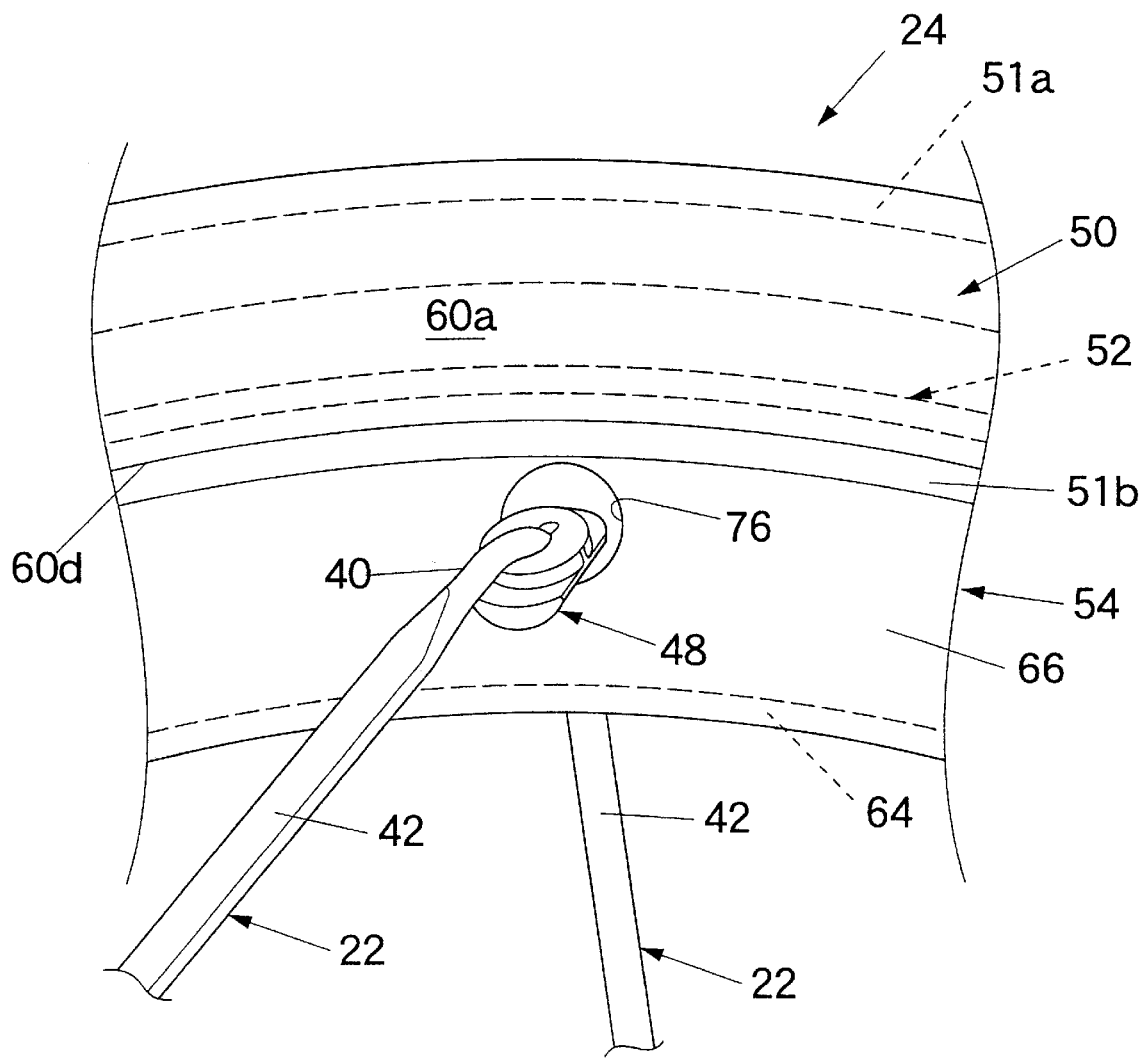
FIG. 10 is an enlarged, partial side elevational view of a portion of the rear bicycle wheel illustrating the spoke and reinforcement member in a first orientation prior to inserting the outer end of the spoke and reinforcement member into one of the spoke openings.
Figure 11:
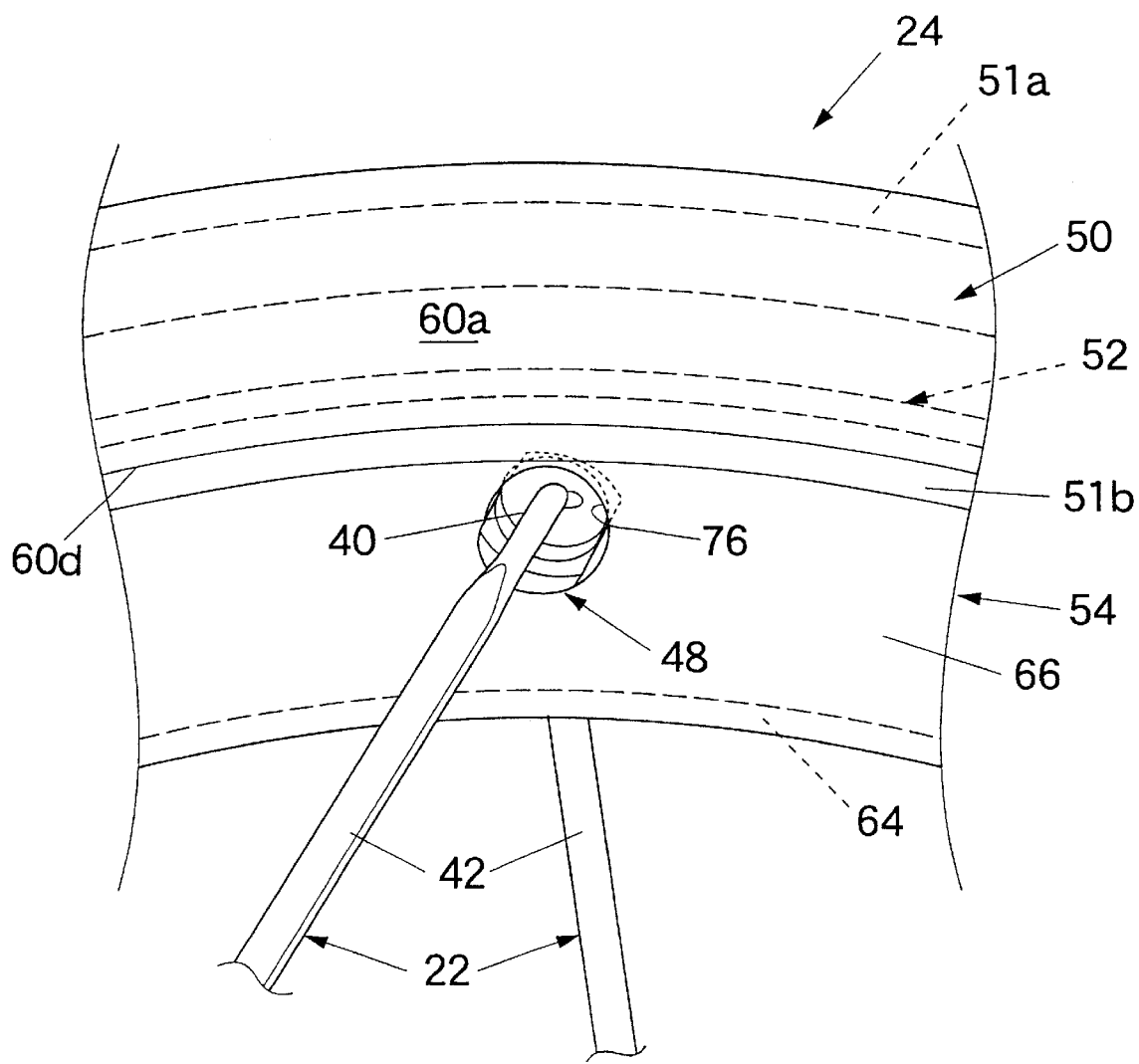
FIG. 11 is an enlarged, partial side elevational view of a portion of the rear bicycle wheel illustrating the spoke and reinforcement member in the first orientation after starting to insert the reinforcement member and the outer end of the spoke into the spoke opening of the rim.

Referring to FIG. 6, spoke openings 76 preferably have radial lengths E larger than one-half radial lengths $D_3$ of spoke attachment sections 66 (i.e. larger than about 5.25 millimeters). More specifically, spoke openings 76 preferably are substantially circular openings that preferably have radial lengths E or diameters of approximately 6.1 millimeters ±0.05 millimeters. Of course, it will be apparent to those skilled in the art that spoke openings 76 could have other shapes and/or sizes as needed and/or desired without departing from the scope of the present invention. In any event, spoke openings 76 are sized and configured such that outer end portions 40 of spokes 22 with reinforcement members 48 located thereon can be inserted through spoke openings 76 as seen in FIGS. 10 and 11. Moreover, spoke openings 76 are sized and configured to retain outer end portions 40 with reinforcement members 48 mounted thereon within spoke openings 76 when spokes 22 are installed to rim 24 and hub 20.

Referring to FIGS. 12 and 13, spokes 22 will now be discussed in more detail. As mentioned above, each of the spokes 22 has an outer end portion 40, a center or middle portion 42 and an inner end portion 44. Inner end portions 44 are preferably externally threaded for receiving spoke nipples 46. Outer end portions or spoke heads 40 are coupled to rim 24 by reinforcement members or washers 48. Reinforcement members or washers 48 are designed to disperse the stresses applied to rim 24 by spokes 22.

Straight center portion 42 is located radially inwardly of outer end portion 40, and inner end portion 44 is located radially inwardly of the center portion 42. Each inner end portion 44 is preferably externally threaded for receiving spoke nipple 46. Moreover, each inner end portion 44 forms a hub attachment end of each spoke 22. Inner end portions 44 are coupled to hub 20 in a relatively conventional manner (i.e., radially on one side of hub 20 and tangentially on the other side of hub 20). Preferably, outer end portion 40, center portion 42 and inner end portion 44 are constructed as a one-piece, unitary member with a spoke nipple 46 threadedly coupled to each inner end portion 44 of the spokes 22 for connection to hub 20.

In this embodiment, outer end portions 40 of spokes 22 each have a bent section 47 with an enlarged head 49 formed at the free end of bent section 47. Bent section 47 has a circular cross-section of a predetermined width or diameter. The enlarged head 49 has a larger width or diameter to secure spoke 22 to rim 24 via reinforcement member or washer 48. Each enlarged head 49 is shaped so as not to interfere with the rim 24 when mounting (or inserting) the outer end portions 40 of spokes 22 with reinforcement members 48 mounted thereto into spoke openings 76. Therefore, wheel 12 can be easily assembled, without the need for additional access apertures formed in outer annular portion 52. Each enlarged head 49 and each bent section 47 form a rim attachment end of each spoke 22. Center portions 42 and inner end portions 44 each have a circular or elliptical cross section. Of course, it will be apparent to those skilled in the art that the entire length of spokes 22 can be substantially uniform along their entire cross sections if needed and/or desired. It will also be apparent to those skilled in the art that constant cross section spokes can be utilized or spokes with a varying cross section can be utilized as needed and/or desired.

As also seen in FIGS. 12 and 13, outer end portions 40 of spokes 22 are bent to form enlarged heads 49 at the free ends of spokes 22, which are offset from the bent sections 47. Of course, it will be apparent to those skilled in the art from this disclosure that outer end portions 40 can be bent or formed to have a different shapes and/or cross sections than the illustrated shapes and cross sections. In any event, the shapes and cross sections of bent sections 47 and enlarged heads 49 of each spoke 22 should be configured to prevent axial movement of spoke 22 relative to rim 24 when the spoke 22 is in the installed position.

Center portions 42 of spokes 22 are illustrated as being substantially straight wire type spokes with substantially elliptical cross sections. However, it will be apparent to those skilled in the art from this disclosure that center portions 42 of spokes 22 can be configured to have other types of cross sections and/or shapes. For example, center portions 42 can be circular or more rectangular in cross section with the shape being uniformed along the entire length of center portion 42. Alternatively, the cross section of center portion 42 can vary along its length such that the cross section of center portion 42 becomes wider as it approaches hub 20. In other words, the thickness and/or width of center portion 42 can be either uniform or varied as needed and/or desired.

Inner end portions 44 of spokes 22 are threaded for receiving conventional spoke nipples 46 thereon. More specifically, inner end portions 44 of spokes 22 are inserted through one end of bores 34 of hub 20 or spoke attachment slots 38, and then spoke nipples 46 are inserted through the other end of bores 34 or spoke attachment slots 38. The headed or flanged portion of the spoke nipples 46 engage an internal abutment surface of bores 34 or spoke attachment slots 38 to fixedly secure inner end portions 44 of spokes 22 to hub 20. Accordingly, spokes 22 can be tightened in a substantially conventional manner between hub 20 and rim 24 to secure inner end portions 44 of spokes 22 thereto.

Referring to FIGS. 14–19, reinforcement members 48 will now be discussed in more detail. Reinforcement members 48 are designed to disperse the stresses applied to rim 24 by spokes 22. Reinforcement members 48 are designed to pass through the spoke openings 76 in a first relative orientation between reinforcement members 48 and the spoke openings 76, as seen in FIGS. 10 and 11. The reinforcement members 48 are also designed to be retained within the spoke openings 76 in a second relative orientation between the reinforcement members 48 and the spoke openings 76, as seen in FIG. 3. Reinforcement members 48 are preferably elongated disk shaped members with each reinforcement member or washer 48 having a first (smaller) substantially circular stepped portion 80, a second (larger) elongated stepped portion 82 and a centrally located spoke hole 84.

Preferably, each reinforcement member or washer 48 is constructed as a one-piece, unitary metallic member. An example of one suitable material for reinforcement members 48 is aluminum alloy. Of course, other materials can be used. Moreover, reinforcement members 48 can be made of the same material as rim 24 or a different material from rim 24. It will be readily apparent to those skilled in the art from this disclosure that reinforcement members 48 do not have to be stepped as illustrated, but can have other shapes that can carry out the advantages of the present invention.

Preferably, reinforcement members 48 have an axial thickness of at least about 2.2 millimeters. The diameters or widths of first and second portions 80 and 82 should be relatively large to disperse the stresses on rim 24 from spokes 22. The axial thickness of first (smaller) stepped portion 80 is preferably approximately the same thickness as spoke attachment sections 66 (i.e. approximately 1.1 millimeters), while the axial thickness of second (larger) stepped portion 82 is preferably larger than the axial thickness of first (smaller) stepped portion 80. It will be apparent to those skilled in the art from this disclosure that axial thickness of first and second stepped portions 80 and . 82 of reinforcement members 48 can be modified as needed and/ or desired. In any event, reinforcement members 48 have first and second transverse dimensions Y and Z (noted in FIGS. 14 and 15) that are so dimensioned relative to spoke openings 76 such that the reinforcement members 48 with the outer portions 40 of the spokes 22 coupled thereto can pass through spoke openings 76 in the first relative orientation and be retained in spoke openings 76 in the second orientation.

First substantially circular stepped portion 80 of each reinforcement member 48 can be frictionally retained within one of the spoke openings 76 of rim 24. Since spokes 22 are placed under tension between hub 20 and rim 24, spokes 22 apply an inward radial force at circumferentially spaced locations that correspond to spoke openings 76. Reinforcement members 48 disperse the stresses on rim 24 from spokes 22. Specifically, first substantially circular stepped portion 80 of each reinforcement member 48 increases the effective diameter or width of spoke 22 to spread out the stresses on the rim 24. Accordingly, the strength of rim 24 is increased without adding thickness to the wall of spoke attachment sections 66.

Referring still to FIGS. 14–19, each first substantially circular stepped portion 80 of each reinforcement member 48 has a first maximum width and each second elongated stepped portion 82 has a second maximum width that forms an abutment surface 86 between first and second portions 80 and 82. First substantially circular stepped portions 80 are sized and configured to be located within spoke opening 76 of spoke attachment sections 66 of rim 24, such that abutment surface 86 contacts the interior of rim 24. In this embodiment, each second transverse dimension Z (noted in FIG. 14) is substantially equal to the second maximum width of second elongated stepped portions 82. Therefore, abutment surfaces 86 retain the reinforcement members 48 in the spoke openings 76.

Preferably, abutment surface 86 of each reinforcement member 48 is formed by two abutment sections 86a and 86b (bottom and top abutment sections 86a and 86b) located on opposite sides of first portion 80. Abutment sections 86a and 86b extend from a pair of end surfaces 87a and 87b (bottom and top end surfaces 87a and 87b) of second portion 82 to the outer periphery of first portion 80. End surfaces 87a and 87b are partial cylindrical surfaces extending in an axial direction of reinforcement members 48. In other words, end surfaces 87a and 87b lie on an imaginary cylinder with a diameter corresponding to the second maximum width of second portion 82 and the second transverse dimension Z of reinforcement member 48. Thus, reinforcement members 48 can be retained in spoke openings 76.

Each reinforcement member 48 includes a pair of curved side surfaces 88 extending generally in the longitudinal direction of the reinforcement members 48. The first transverse dimension Y (noted in FIG. 15) is measured between the pair of curved side surfaces 88. Transverse dimension Y is preferably the same, or slightly smaller than the size of spoke openings 76. More specifically, transverse dimension Y (noted in FIG. 15) is preferably about 6.0 millimeters ±0.05 millimeters. In other words, curved side surfaces 88 are preferably formed on an imaginary circle or cylinder with a diameter of approximately 6.0 millimeters ±0.05 millimeters. Accordingly, transverse dimension Y can be considered the diameter of this imaginary circle or cylinder. Due to this arrangement, reinforcement members 48 can be inserted into spoke openings 76 with outer portions 40 of spokes 22 coupled thereto, as seen in FIGS. 10 and 11.

Figure 15:
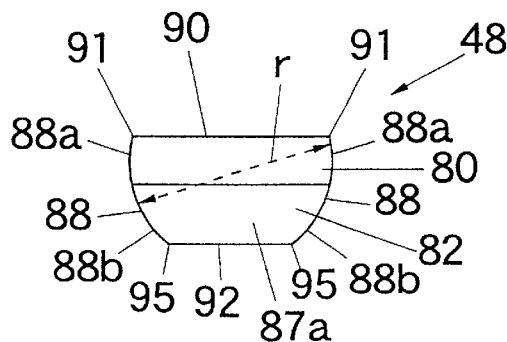
FIG. 15 is an end edge elevational view of the reinforcement member or washer illustrated in FIG. 14.
Figure 18:
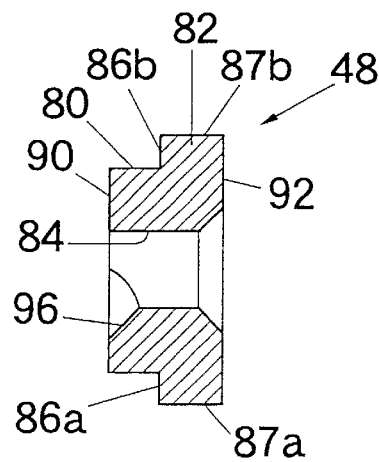
FIG. 18 is a longitudinal cross-sectional view of the reinforcement member or washer illustrated in FIGS. 14–17 as seen along section line 18—18 of FIG. 14.
Figure 16:
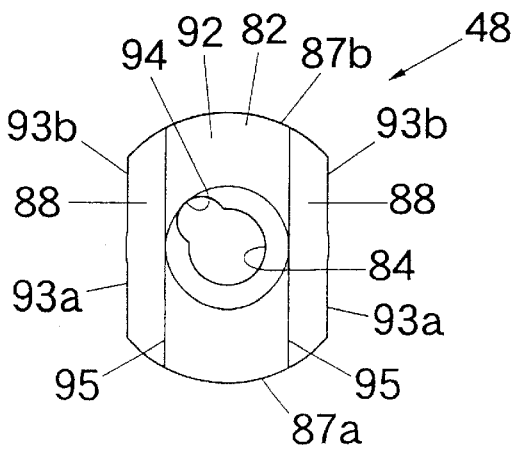
FIG. 16 is an opposite side elevational view of the reinforcement member or washer illustrated in FIGS. 14 and 15.
Figure 19:
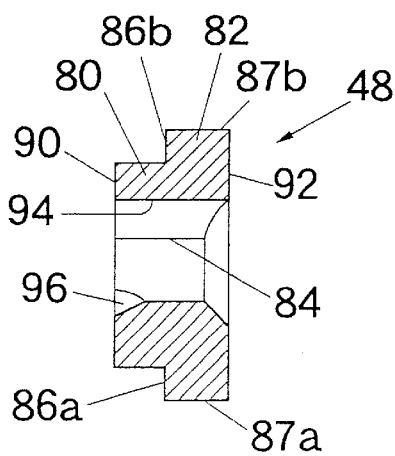
FIG. 19 is a longitudinal cross-sectional view of the reinforcement member or washer illustrated in FIGS. 14–17 as seen along section line 19—19 of FIG. 14.

Basically, curved side surfaces 88 are formed by a pair of first curved side sections 88a formed on the outer periphery of first portion 80, and a pair of second curved side sections 88b formed on second portion 82 as best seen in FIG. 15. The maximum width of first portion 80 is preferably approximately 6.0 millimeters (+0.05 millimeters or −0.01 millimeters). Accordingly, the maximum width of first portion 80 can be slightly larger than the first transverse dimension Y. Therefore, in the illustrated embodiment, first portion 80 does not have a completely cylindrical outer peripheral surface and has the pair of first curved side sections 88a. In other words, the outer peripheral surface of the first portion 80 is substantially cylindrical, except for the presence of the pair of first curved side sections 88a. On the other hand, spoke openings 76 are preferably circular openings. Of course, it will be apparent to those skilled in the art that various shapes and sizes of spoke openings 76 and reinforcement members 48 can be utilized without departing from the scope of the present invention.

Curved side surfaces 88 are basically convex curved surfaces that extend between a pair of axial faces 90 and 92 of first and second portions 80 and 82 of reinforcement members 48 to form several pairs of parallel edges. Specifically, the first edges 91 are formed at end face 90, the second edges 93a and 93b are formed at abutment sections 86a and 86b, and the third edges 95 are formed at end face 92.

Preferably, each reinforcement member 48 has a spoke hole 84 extending therethrough with one of the spokes 22 received in the spoke hole 84 as mentioned above. In this embodiment, each of the spoke holes 84 of each reinforcement member 48 is non-circular in transverse cross-section.

Spoke holes 84 of reinforcement washers 48 are designed so that spokes 22 can freely pass therethrough. In the illustrated embodiment, the center portions 42 of spokes 22 are elliptical in cross-section. Accordingly, spoke holes 84 have longitudinally extending slots 94 that increase the effective diameter or width of spoke holes 84 to allow the center portions 42 of spokes 22 to pass therethrough.

A slanted cutout or notch 96 is formed on the axial face of first stepped portion 80. This notch 96 accommodates the bent section 47 of the outer end portion 40 of spoke 22. Preferably, notch 96 is located approximately 135° from slot 94. Thus, when bent section 47 of spoke 22 is seated in notch 96, movement of spoke 22 in spoke hole 84 is limited. Notch 96 is arranged so the center portion 42 is substantially parallel to the curved side surfaces 88 and the edges 93a and 93b.

In assembling bicycle wheel 12, reinforcement members 48 are first placed on the outer end portions 40 of spokes 22. Specifically, the inner end portions 44 of spokes 22 are first inserted into spoke holes 84 of reinforcement members 48. Then, the spokes 22 are rotated so that the longer width portion of the elliptical center portions 42 are aligned with slots 94 such that the center portions 42 of spokes 22 can pass through spoke holes 84 of reinforcement members 48. Once the center portions 42 of spokes 22 have passed through spoke holes 84 of reinforcement members 48, the spokes 22 can be further rotated within spoke holes 84. The bent sections 47 of the spokes 22 are then seated in notches 96 and heads 49 of spokes 22 engage the axial surfaces 92 of second stepped portions 82 of reinforcement members 48.

Now, the spokes 22 with reinforcement members 48 thereon can be installed into rim 24. The outer end portions 40 of spokes 22 with reinforcement members 48 are inserted into the spoke openings 76 in the spoke attachment sections 66 of rim 24 at an angle (first orientation) such that the reinforcement members 48 pass completely through spoke openings 76. Once the outer end portions 40 of spokes 22 and washers 48 have fully entered the interior area A of rim 24, the first stepped portions 80 of reinforcement washers 48 are seated in the spoke openings 76 of rim 24 (moved to the second orientation). Preferably, spoke openings 76 are slightly larger than or the same size as the maximum width of stepped portion 80 such that washers 48 are either loosely received within spoke openings 76 or securely received via interference fit.

Now, the inner end portions 44 of spokes 22 are inserted into openings 34 and slots 38 of hub 20. Spoke nipples or nuts 46 are also inserted into openings 34 and slots 38, and threaded onto the inner end portions 44 of spokes 22. The tension in spokes 22 is then adjusted such that rim 24 is properly positioned about hub 20. The wheel 12 can now be installed on a frame of a bicycle in a conventional manner via hub 20. However, due to the above configuration, tubeless tire 26 does not have to be removed to repair or replace spokes 22.

Second Embodiment

Figure 20:
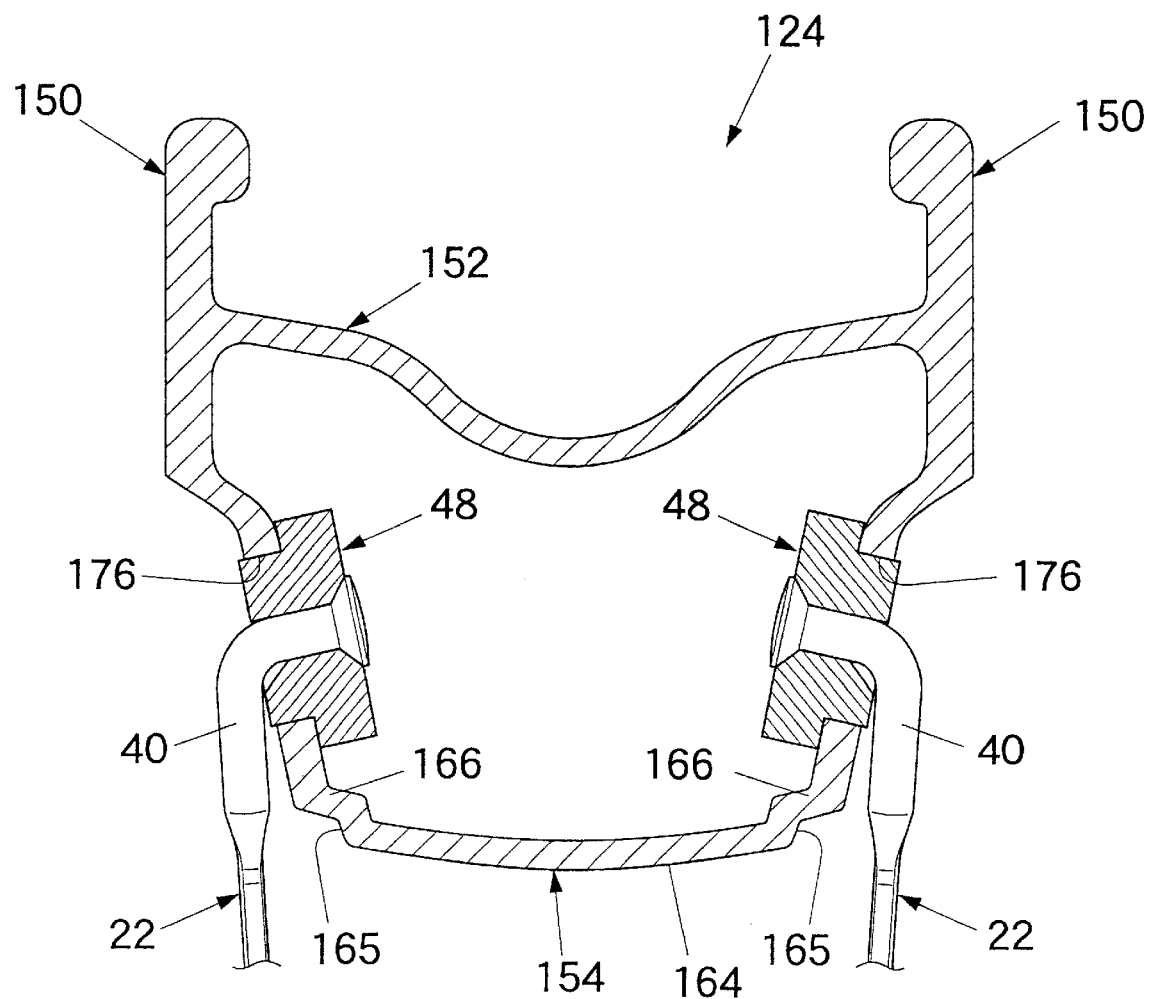
FIG. 20 is an enlarged, partial cross-sectional view of a bicycle rim with a pair of spokes illustrated in elevation and the rim and reinforcement members illustrated in cross-section in accordance with a second embodiment of the present invention.

Referring now to FIG. 20, an alternate rim 124 is illustrated in accordance with a second embodiment of the present invention. Basically, rim 124 is identical to rim 24 of the first embodiment except that the shape of rim 124 has been modified slightly. More specifically, rim 124 is identical to rim 24 of the first embodiment, except that rim 124 includes are pair of indented annular sections 165. In view of the similarities between the rims 24 and 124, the following description of the rim 124 will focus mainly on the differences. Accordingly, it will be apparent to those skilled in the art from this disclosure that most of the description of the rim 24 applies to the description of rim 124.

Rim 124 basically includes a pair of annular side portions 150, an outer annular portion 152 and an inner annular portion 154. Annular side portions 150 and outer annular portion 152 are identical to annular side portions 50 and outer annular portion 52 of the first embodiment. Thus, annular side portions 150 and outer annular portion 152 will not be discussed or illustrated in detail herein. Inner annular portion 154 is a slightly modified version of inner annular portion 54 of the first embodiment. More specifically, inner annular portion 154 of this second embodiment includes an inner annular section 164, a pair of annular spoke attachment sections 166 and a pair of indented annular sections 165. Indented annular sections 165 connect spoke attachment sections 166 to inner annular section 164. Spoke attachment sections 166 include a plurality of spoke openings 176 for receiving outer ends 40 of spokes 22 with reinforcement members or washers 48 therein in a manner identical to the first embodiment. In other words, inner annular section 154 of this second embodiment is identical to inner annular section 54 of the first embodiment except for the presence of indented annular sections 165. Thus, rim 124 of this second embodiment will not be discussed or illustrated in further detail herein.

Third Embodiment

Figure 21:
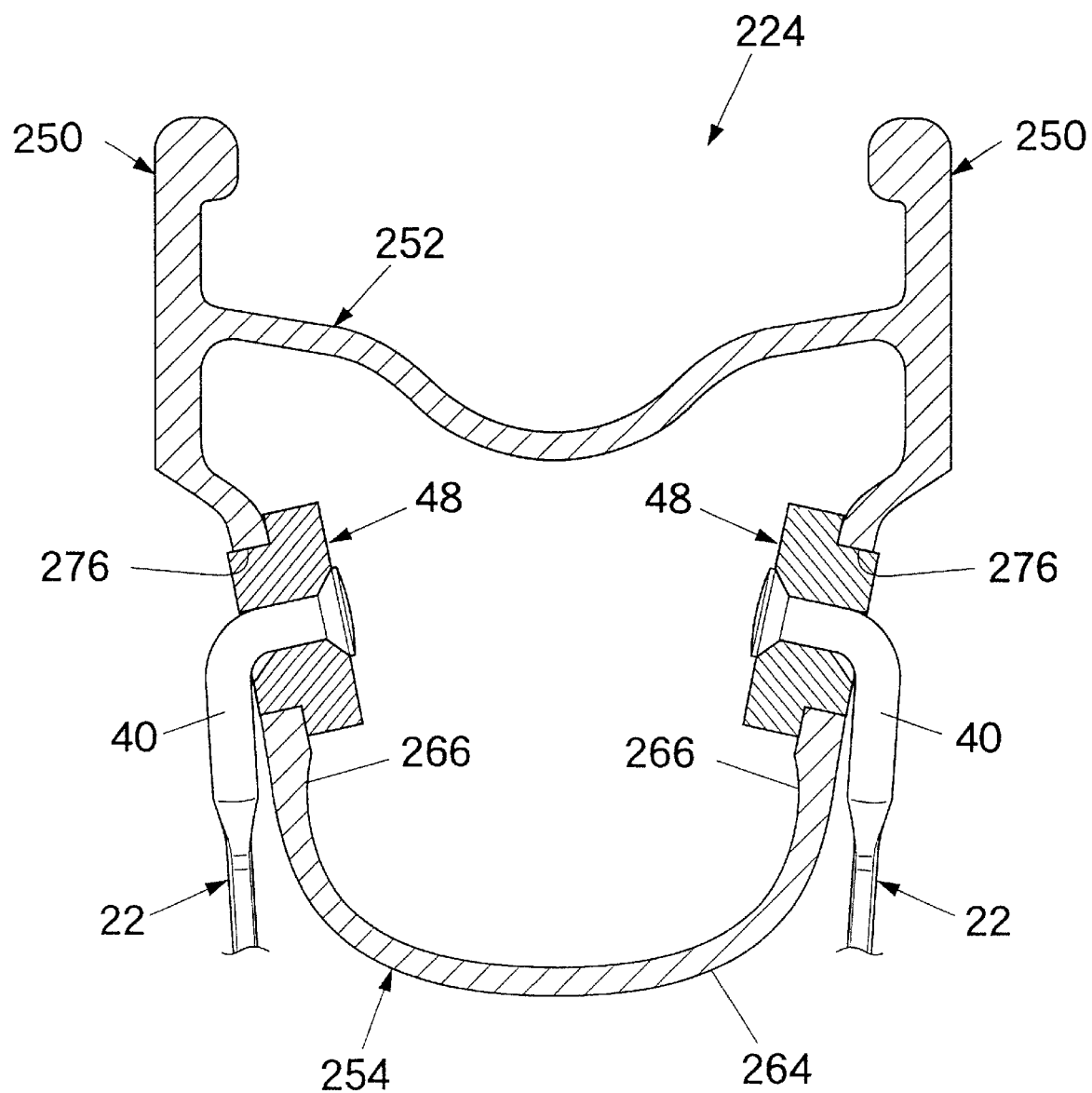
FIG. 21 is an enlarged, partial cross-sectional view of a bicycle rim with a pair of spokes illustrated in elevation and the rim and reinforcement members illustrated in cross-section in accordance with a third embodiment of the present invention.

Referring now to FIG. 21, an alternate rim 224 is illustrated in accordance with a third embodiment of the present invention. Basically, rim 224 is identical to rim 24 of the first embodiment except that the shape of rim 224 has been modified slightly. Specifically, rim 224 is identical to rim 24 of the first embodiment, except that rim 224 is a deep rim in which the rim height is greater than the rim width (as seen in cross-section) with a curved inner annular section. In view of the similarities between the rims 24 and 224, the following description of the rim 224 will focus mainly on the differences. Accordingly, it will be apparent to those skilled in the art from this disclosure that most of the description of the rim 24 applies to the description of rim 224.

Rim 224 basically includes a pair of annular side portions 250, an outer annular portion 252 and an inner annular portion 254. Annular side portions 250 and outer annular portion 252 are identical to annular side portions 50 and outer annular portion 52 of the first embodiment. Thus, annular side portions 250 and outer annular portion 252 will not be discussed or illustrated in detail herein. Inner annular portion 254 is a slightly modified version of inner annular portion 54 of the first embodiment. More specifically, inner annular portion 254 of this second embodiment includes a curved inner annular section 264 and a pair of annular spoke attachment sections 266 extending radially outwardly there-from. Spoke attachment sections 266 are connected to curved inner annular section 264 via transitional curves to form a substantially smooth U-shaped member. Spoke attachment sections 266 include a plurality of spoke openings 276 for receiving outer ends 40 of spokes 22 with reinforcement members or washers 48 therein in a manner identical to the first embodiment. In other words, inner annular section 254 of this second embodiment is identical to inner annular section 54 of the first embodiment, except for the inner annular section 264 is curved U-shaped section. Thus, rim 224 of this third embodiment will not be discussed or illustrated in further detail herein.

Fourth Embodiment

Figure 22:
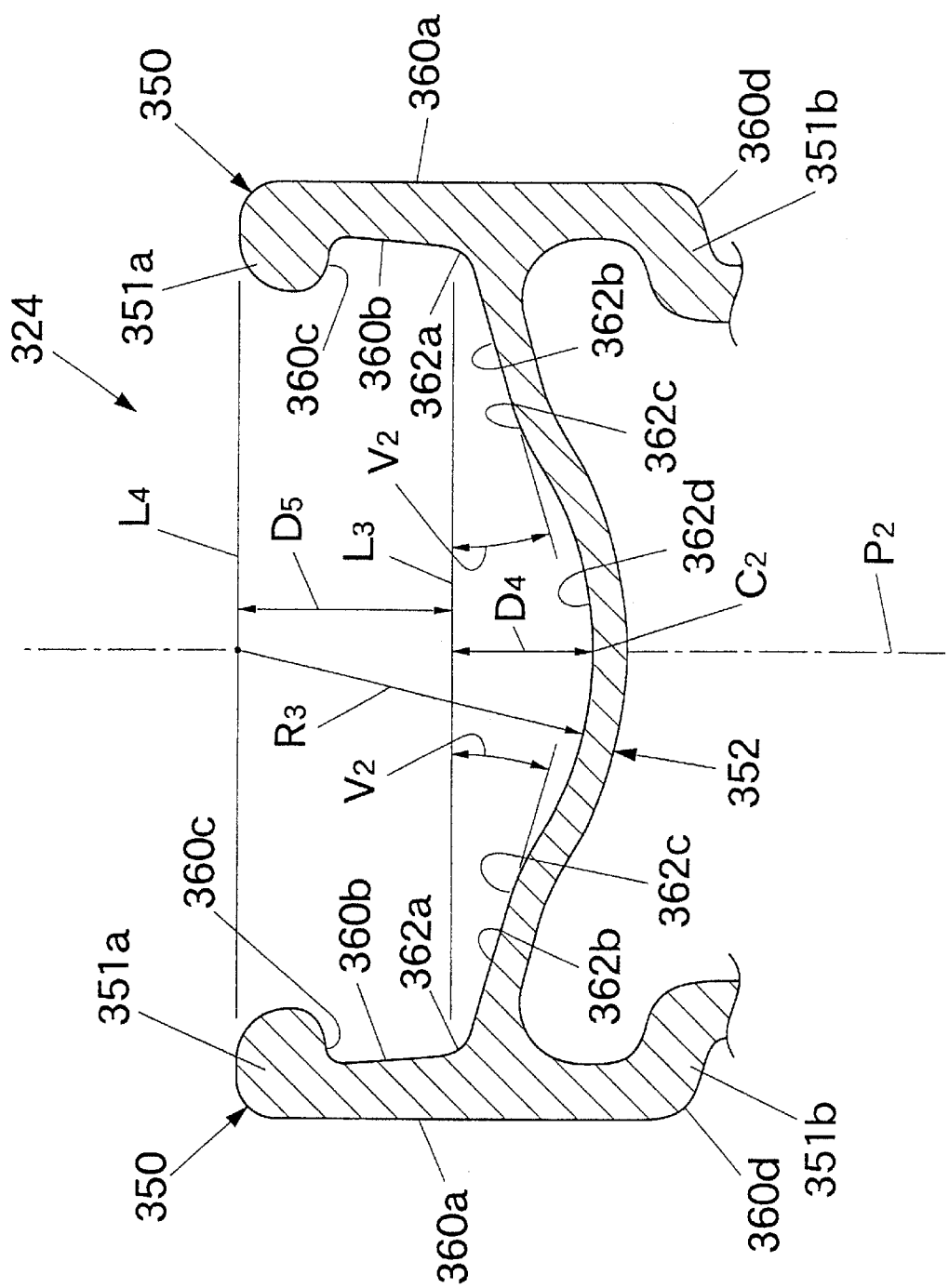
FIG. 22 is an enlarged, partial cross-sectional view of an outer portion of a bicycle rim in accordance with a fourth embodiment of the present invention.

Referring now to FIG. 22, a portion of an alternate rim 324 is illustrated in accordance with a fourth embodiment of the present invention. Basically, rim 324 is identical to rim 24 of the first embodiment except that the shape of rim 324 has been modified slightly. More specifically, rim 324 is identical to rim 24 of the first embodiment, except that the shape of the outer portion of rim 324 has been modified. In view of the similarities between the rims 24 and 324, the following description of the rim 324 will focus mainly on the differences. Accordingly, it will be apparent to those skilled in the art from this disclosure that most of the description of the rim 24 applies to the description of rim 324. Moreover, it will be apparent to those skilled in the art that the outer portion of rim 324 could be used with rims 24, 124 and 224 of the first, second and third embodiments, respectively, if needed and/or desired.

Rim 324 basically includes a pair of annular side portions 350, an outer annular portion 352 and an inner annular portion (not shown). Annular side portions 350 and outer annular portion 352 are modified versions of annular side portions 50 and outer annular portion 52 of the first embodiment. The inner annular portion (not shown) of rim 324 is preferably identical to inner annular portion 54 of the first embodiment. Thus, the inner annular portion (not shown) of rim 324 will not be discussed or illustrated in detail herein. Of course, it will be apparent to those skilled in the art that annular side portions 350 and outer annular portion 352 of this fourth embodiment can be used with inner annular portions 154 and 254 of the second and third embodiments, respectively, if needed and/or desired.

Annular side portions 350 basically include a pair of annular ribs 351a and a pair of annular bent sections 351b to form a pair of oppositely facing braking surfaces 360a, a pair of opposed tire supporting surface 360b and a pair of abutment surfaces 360c. Annular bent sections 351b are angled relative to annular side portions 350 to form a pair of annular curved external corners 360d. Curved external corners 360d replace sharp external corners 60d of the first embodiment. Tire supporting surfaces 360b are slightly modified versions of tire supporting surfaces 60b of the first embodiment. More specifically, tire supporting surfaces 360b are tapered about five degrees relative to a center plane $P_2$ of rim 324.

Outer annular portion 352 of this fourth embodiment includes a pair of annular outer corners 362a, a pair of annular inclined surfaces 362b, a pair of annular transitional inner corners 362c and a curved connecting surface 362d. Annular inclined surfaces 362b are preferably angled an angle $V_2$ of approximately seventeen degrees relative to an imaginary line $L_3$ passing through outer corners 362a. Curved connecting surface 362d preferably is a concave curved surface and has a radius of curvature $R_3$ of approximately 9.5 millimeters. Transitional inner corners 362c are preferably convex curved surfaces, which connect annular inclined surfaces 362b to curved connecting surface 362d in a smooth manner without any abrupt changes in direction. Curved connecting surface 362d preferably has a center point $C_2$ lying on plane $P_2$ spaced about 9.5 millimeters from an imaginary line $L_4$ passing through the outer peripheries of annular side portions 350. Thus, center point $C_2$ is preferably spaced a distance $D_4$ of about 3.2 millimeters from imaginary line $L_3$. Imaginary line $L_4$ is preferably spaced radially outwardly a distance $D_5$ of between about 4.5 millimeters and about 6.5 millimeters from imaginary line $L_3$. More specifically, imaginary line $L_4$ is preferably spaced radially outwardly a distance $D_5$ of about 6.3 millimeters from imaginary line $L_3$ in this fourth embodiment. Therefore, an annular tire receiving recess is formed by annular side portions 350 and outer annular portion 352. In other words, rim 324 of this fourth embodiment is identical to rim 24 of the first embodiment except the shape of annular side portions 350 and the outer annular portion 352 have been slightly modified. Thus, rim 324 of this fourth embodiment will not be discussed or illustrated in further detail herein.

Fifth Embodiment

Figure 24:
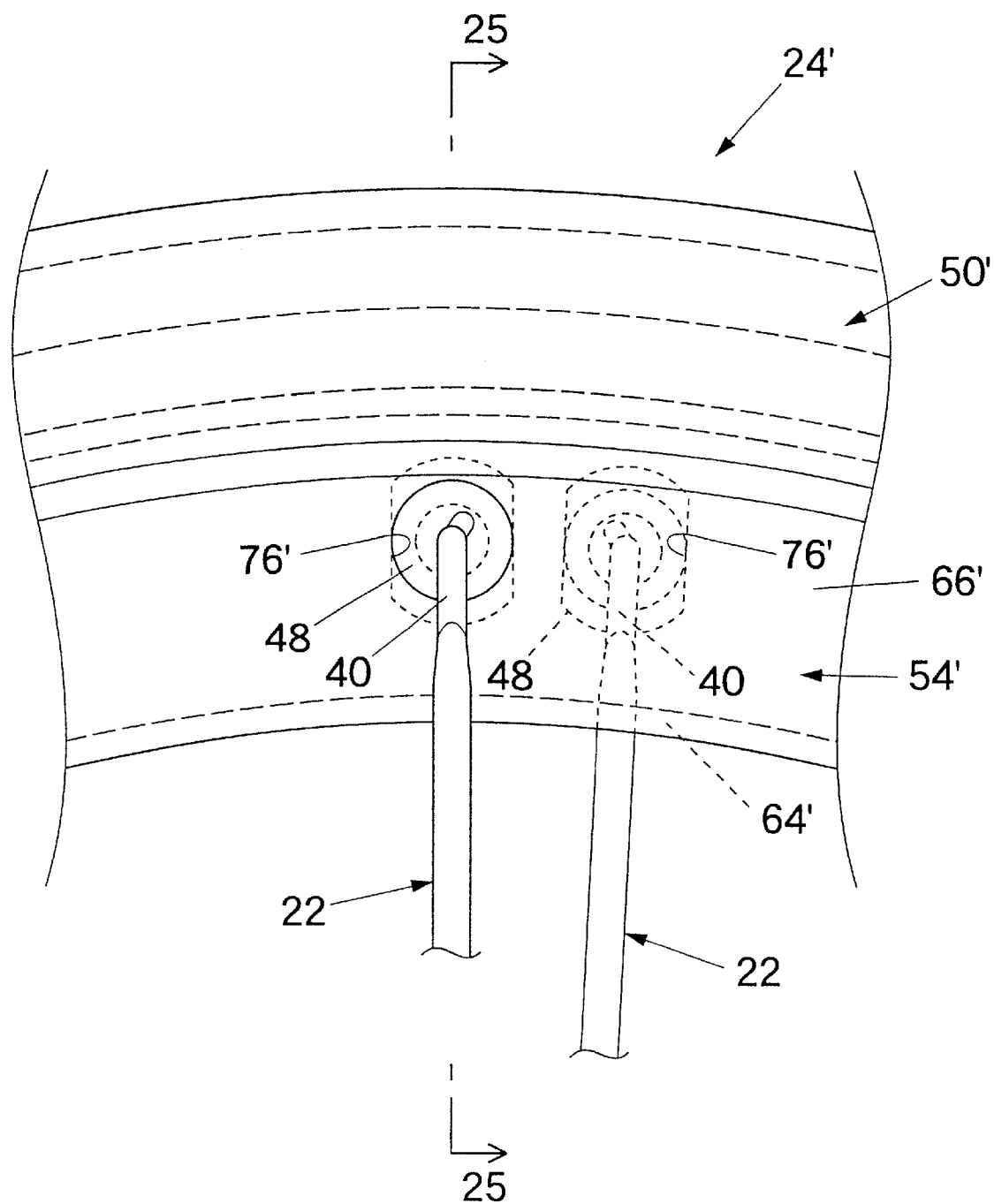
FIG. 24 is an enlarged, partial side elevational view of a portion of the bicycle wheel illustrated in FIG. 23 showing the connection between the rim and two of the spokes of the bicycle wheel offset in the circumferential direction.
Figure 25:
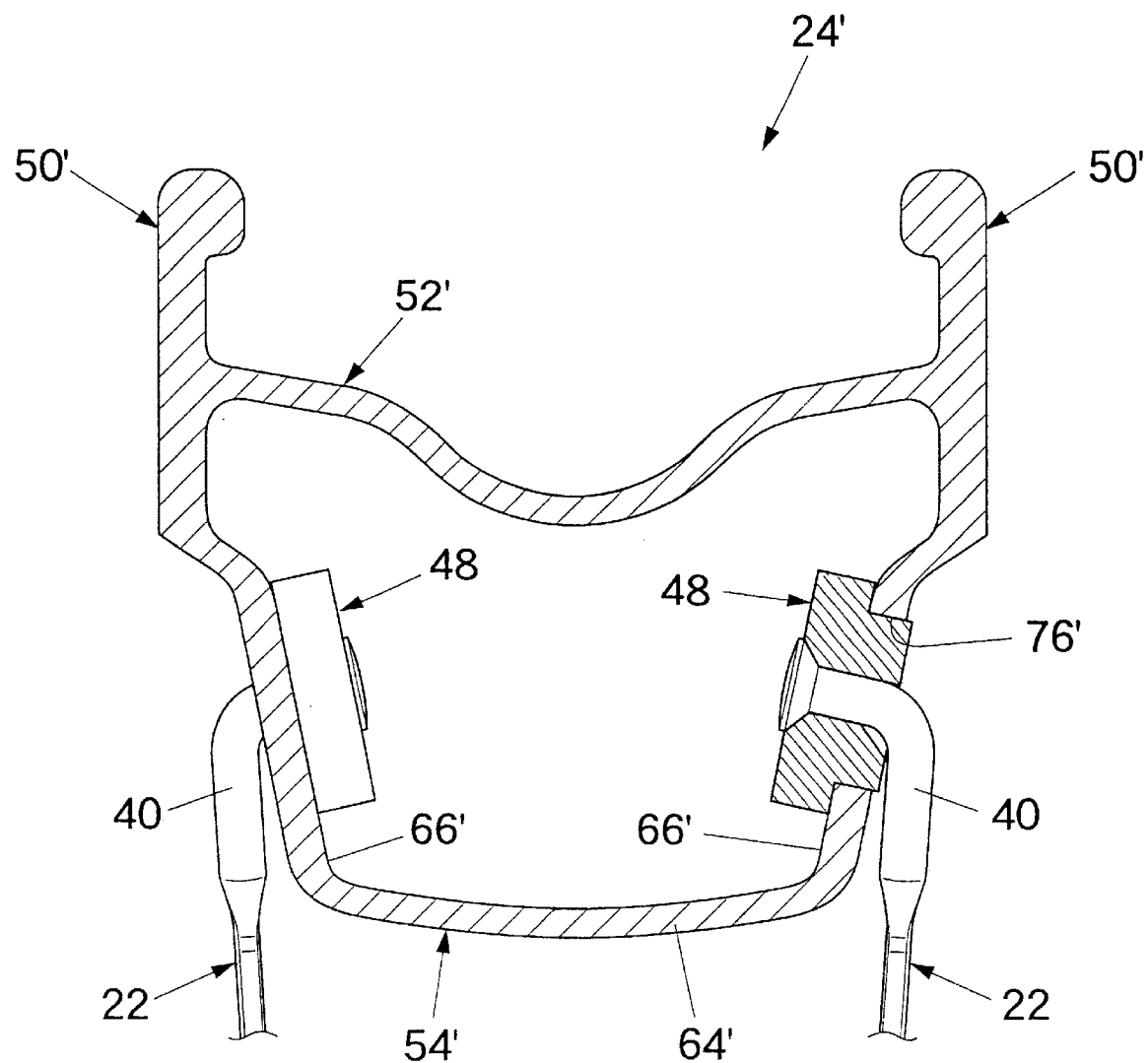
FIG. 25 is a partial cross-sectional view of the bicycle rim as seen along section line 25—25 of FIG. 24 with two of the spokes of the bicycle wheel offset in the circumferential direction.

Referring now to FIGS. 23–25, an alternate bicycle wheel 12' with an alternate front hub 20', twenty tangential spokes 22 with reinforcement members 48 and a rim 24' is illustrated in accordance with a fifth embodiment of the present invention. Basically, rim 24' is identical to rim 24 of the first embodiment, except that configuration of the spoke openings has been modified for use with modified hub 20'. More specifically, rim 24' includes circumferentially offset pairs of spoke openings 76' rather than the circumferentially aligned pairs of spoke openings 76 of rim 24 of the first embodiment. Moreover, rim 24' is designed for use with twenty (20) spokes 22. In view of the similarities between the rims 24 and 24', the following description of the rim 24' will focus mainly on the differences.

While wheel 12' is a front wheel, it will be apparent to those skilled in the art from this disclosure that the description pertaining to the construction of bicycle wheel 12' applies to either a front bicycle wheel or a rear bicycle wheel. Moreover, it will be apparent to those skilled in the art that rim 24' could utilize more or less than twenty spokes and/or radial spokes if needed and/or desired. Finally, it will be apparent to those skilled in the art from this disclosure that most of the description of the rim 24 applies to the description of rim 24' of this fifth embodiment.

Rim 24' basically includes a pair of annular side portions 50', an outer annular portion 52' and an inner annular portion 54'. Annular side portions 50' and outer annular portion 52' are identical to annular side portions 50 and outer annular portion 52 of the first embodiment. Thus, annular side portions 50' and outer annular portion 52' will not be discussed or illustrated in detail herein. Inner annular portion 54' is a slightly modified version of inner annular portion 54 of the first embodiment. More specifically, inner annular portion 54' of this fifth embodiment includes an inner annular section 64' and a pair of annular spoke attachment sections 66'. Spoke attachment sections 66' include a plurality of circumferentially arranged spoke openings 76'.

Spoke openings 76' of this fifth embodiment are identical to spoke openings 76 of the first embodiment except that opposing pairs of spoke openings 76' are circumferentially offset from each other. Spoke openings 76 are configured for receiving outer ends 40 of spokes 22 with reinforcement members or washers 48 therein in a manner identical to the first embodiment. This configuration of rim 24' is designed for a front hub 20' with twenty tangential spokes 22. In other words, hub 20' has a pair of spaced spoke attachment flanges, each flange having five spoke attachment points 32'. Two spokes 22 are coupled to each spoke attachment point. These types of hubs are relatively conventional. Thus, hub 20' will not be discussed or illustrated in detail herein. In other words, rim 24' of this fifth embodiment is identical to rim 24 of the first embodiment, except the configuration (or arrangement) of the spoke openings 76' have been slightly modified. Thus, rim 24' of this fifth embodiment will not be discussed or illustrated in further detail herein.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle rim comprising:
   first and second annular side portions having first and second ribs to form opposing first and second annular tire supporting surfaces;
   an outer annular portion extending between said first and second annular side portions to form first and second outer corners, said outer annular portion including first and second annular inclined surfaces with a curved connecting surface extending therebetween, said first and second annular inclined surfaces extending radially inwardly from said first and second outer corners to said curved connecting surface, said curved connecting surface having a concave surface contiguously coupled to said first and second annular inclined surfaces by first and second convex transitional inner corners, respectively, said concave surface of said curved connecting surface having a constant first radius and each of said first and second convex transitional inner corners having a convex surface with a constant radius that is substantially equal to said first radius; and
   a spoke attachment portion rigidly coupled with said first and second annular side portions and said outer annular portion,
   said first and second annular inclined surfaces being angled between about three degrees and about seventeen degrees relative to an imaginary line passing through said first and second outer corners.

2. A bicycle rim according to claim 1, wherein
   said curved connecting surface is a concave curved surface in an axial direction with a radius of curvature of approximately 5.0 millimeters.

3. A bicycle rim according to claim 1, wherein
   said first and second annular inclined surfaces are angled about ten degrees relative to said first imaginary line.

4. A bicycle rim according to claim 1, wherein
   said curved connecting surface is a concave curved surface in an axial direction with said first and second convex transitional inner corners formed at opposite ends thereof.

5. A bicycle rim according to claim 4, wherein
   said first and second convex transitional inner corners are formed by convex curved surfaces connecting said concave curved connecting'surface to said first and second annular inclined surfaces in a smooth manner.

6. A bicycle rim according to claim 5, wherein said first and second annular inclined surfaces are angled about ten degrees relative to said first imaginary line.

7. A bicycle rim according to claim 5, wherein said first imaginary line is spaced between about 4.5 millimeters and about 6.5 millimeters from a second imaginary line passing through outer peripheral edges of said first and second annular side portions.

8. A bicycle rim according to claim 7, wherein
   said first imaginary line is spaced about 5.85 millimeters from said second imaginary line.

9. A bicycle rim according to claim 1, wherein
   said first and second annular inclined surfaces are straight surfaces.

10. A bicycle rim according to claim 1, wherein
    each of said first and second annular inclined surfaces has length of approximately 3.39 millimeters between said curved connecting surface and said first and second outer corners, respectively.

11. A bicycle rim according to claim 1, wherein
    said curved connecting surface has a center point spaced about 3.85 millimeters from an imaginary line passing through said first and second outer corners.

12. A bicycle rim according to claim 1, wherein
    said outer annular portion is free of openings except for a single valve aperture that is adapted to receive part of a valve therein.

13. A bicycle rim comprising:
    first and second annular side portions having first and second ribs to form opposing first and second annular tire supporting surfaces;
    an outer annular portion extending between said first and second annular side portions to form first and second outer corners, said outer annular portion including first and second annular inclined surfaces with a curved connecting surface extending therebetween, said curved connecting surface having a concave surface contiguously coupled to said first and second annular inclined surfaces by first and second convex transitional inner corners, respectively, said concave surface of said curved connecting surface having a constant first radius and each of said first and second convex transitional inner corners having a convex surface with a constant radius that is substantially equal to said first radius; and
    an inner annular portion extending radially inwardly of said first and second annular side portions and said outer annular portion to form an annular hollow area, said inner annular portion having a plurality of circumferentially arranged spoke openings formed therein,
    said outer annular portion having at least one aperture, but fewer than half of the number of spoke openings.

14. A bicycle rim according to claim 13, wherein
    said outer annular portion is free of openings except for said aperture that is adapted to receive part of a valve therein.

15. A bicycle rim according to claim 13, wherein
said curved connecting surface is a concave curved surface in an axial direction with a radius of curvature of approximately 5.0 millimeters.
16. A bicycle rim according to claim 13, wherein
said first and second annular inclined surfaces are angled between about three degrees and about seventeen degrees relative to a first imaginary line passing through said first and second outer corners.
17. A bicycle rim according to claim 16, wherein
said first and second annular inclined surfaces are angled about ten degrees relative to said first imaginary line.
18. A bicycle rim according to claim 16, wherein
said first imaginary line is spaced between about 4.5 millimeters and about 6.5 millimeters from a second imaginary line passing through outer peripheral edges of said first and second annular side portions.
19. A bicycle rim according to claim 18, wherein
said first imaginary line is spaced about 5.85 millimeters from said second imaginary line.
20. A bicycle rim according to claim 13, wherein
said curved connecting surface is a concave curved surface in an axial direction with said first and second transitional inner corners formed at opposite ends thereof.
21. A bicycle rim according to claim 20, wherein
said first and second convex transitional inner corners are formed by convex curved surfaces connecting said concave curved connecting surface to said first and second annular inclined surfaces in a smooth manner.
22. A bicycle rim according to claim 13, wherein
said curved connecting surface has a center point spaced about 3.85 millimeters from an imaginary line passing through said first and second outer corners.
23. A bicycle rim according to claim 13, wherein
said inner annular portion includes first and second oppositely facing spoke attachment sections with said plurality of spoke openings formed therein and an inner annular section coupled to said first and second spoke attachment sections.
24. A bicycle rim according to claim 23, wherein
said inner annular portion includes first and second indented annular sections connecting said first and second spoke attachment sections to said inner annular section, respectively.
25. A bicycle rim according to claim 23, wherein
said spoke openings formed in said first spoke attachment section are circumferentially aligned with respective spoke openings formed in said second spoke attachment section.
26. A bicycle rim according to claim 23, wherein
said spoke openings formed in said first spoke attachment section are circumferentially offset from respective spoke openings formed in said second spoke attachment section.
27. A bicycle rim according to claim 13, wherein
said spoke openings are spaced radially outwardly from an innermost radial edge of said inner annular portion.
28. A bicycle assembly comprising:
a bicycle rim including
first and second annular side portions having first and second ribs to form opposing first and, second annular tire supporting surfaces,
an outer annular portion extending between said first and second annular side portions to form first and second outer corners, said outer annular portion including first and second annular inclined surfaces with a curved connecting surface extending therebetween, said curved connecting surface having a concave surface contiguously coupled to said first and second annular inclined surfaces by first and second convex transitional inner corners, respectively, said concave surface of said curved connecting surface having a constant first radius and each of said first and second convex transitional inner corners having a convex surface with a constant radius that is substantially equal to said first radius, and
an inner annular portion extending radially inwardly of said first and second annular side portions and said outer annular portion to form an annular hollow area, said inner annular portion having a plurality of circumferentially arranged spoke openings formed therein,
said outer annular portion having at least one aperture, but fewer than half of the number of spoke openings; and
a plurality of spokes coupled within said spoke openings.
29. A bicycle assembly according to claim 28, further comprising a hub coupled to said plurality of spokes.
30. A bicycle rim comprising:
first and second annular side portions having first and second outer ribs to form opposing first and second annular tire supporting surfaces, and first and second inner bent sections;
an outer annular portion extending between said first and second annular side portions to form first and second outer corners; and
an inner annular portion having first and second spoke attachment sections with radial lengths and an inner annular section extending between said first and second spoke attachment sections, said first and second spoke attachment sections extending radially inwardly from said first and second inner bent sections such that said first and second spoke attachment sections are offset from said first and second side portions, said first and second spoke attachment sections including a plurality of circumferentially arranged spoke openings having radial lengths larger than one half of said radial lengths of said first and second spoke attachment sections.
31. A bicycle rim according to claim 30, wherein
said first and second inner bent sections are angled sections that form first and second sharp external annular corners with said first and second side portions.
32. A bicycle rim according to claim 30, wherein
said outer annular portion is free of openings except for a single valve aperture that is adapted to receive part of a valve therein.
33. A bicycle rim according to claim 30, wherein
said outer annular portion includes first and second annular inclined surfaces with a curved connecting surface extending therebetween.
34. A bicycle rim according to claim 33, wherein
said first and second annular inclined surfaces are angled between about three degrees and about seventeen degrees relative to a first imaginary line passing through said first and second outer corners.
35. A bicycle rim according to claim 30, wherein
said inner annular portion includes first and second indented annular sections connecting said first and second spoke attachment sections to said inner annular section, respectively.

36. A bicycle rim according to claim 30, wherein said spoke openings formed in said first spoke attachment section are circumferentially aligned with respective spoke openings formed in said second spoke attachment section.

37. A bicycle rim according to claim 30, wherein said spoke openings formed in said first spoke attachment section are circumferentially offset from respective spoke openings formed in said second spoke attachment section.

* * * * *